United States Patent
Bennett et al.

(10) Patent No.: US 12,002,164 B2
(45) Date of Patent: *Jun. 4, 2024

(54) AUTHORING AND PRESENTING 3D PRESENTATIONS IN AUGMENTED REALITY

(71) Applicant: Microsoft Technology Licensing, LLC, Redmond, WA (US)

(72) Inventors: Darren Alexander Bennett, Vancouver (CA); David J. W. Seymour, Burnaby (CA); Charla M. Pereira, Vancouver (CA); Enrico William Guld, Vancouver (CA); Kin Hang Chu, Burnaby (CA); Julia Faye Taylor-Hell, Vancouver (CA); Jonathon Burnham Cobb, Vancouver (CA); Helen Joan Hem Lam, Vancouver (CA); You-Da Yang, Burnaby (CA); Dean Alan Wadsworth, North Vancouver (CA); Andrew Jackson Klein, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/384,514

(22) Filed: Jul. 23, 2021

(65) Prior Publication Data

US 2022/0157026 A1 May 19, 2022

Related U.S. Application Data

(63) Continuation of application No. 16/583,479, filed on Sep. 26, 2019, now Pat. No. 11,087,548, which is a (Continued)

(51) Int. Cl.
*G06T 15/00* (2011.01)
*G02B 27/01* (2006.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
CPC . G06T 13/20; G06T 19/20; G06T 2219/2024; G06T 19/003; G06T 19/006;
(Continued)

(56) References Cited

U.S. PATENT DOCUMENTS 8,982,132 B2 * 3/2015 Blas, Jr. ................. G06T 13/00
345/475
9,396,574 B2 * 7/2016 Frederickson .......... G06T 13/40
(Continued)

OTHER PUBLICATIONS

Joao Beira, 3D [Embodied], Jan. 20, 2017; http://joaobeira.com/portfolio/3dembodied/.*
(Continued)

*Primary Examiner* — Phu K Nguyen
(74) *Attorney, Agent, or Firm* — Shook, Hardy & Bacon L.L.P.

(57) ABSTRACT

Various methods and systems are provided for authoring and presenting 3D presentations. Generally, an augmented or virtual reality device for each author, presenter and audience member includes 3D presentation software. During authoring mode, one or more authors can use 3D and/or 2D interfaces to generate a 3D presentation that choreographs behaviors of 3D assets into scenes and beats. During presentation mode, the 3D presentation is loaded in each user device, and 3D images of the 3D assets and corresponding asset behaviors are rendered among the user devices in a
(Continued)

coordinated manner. As such, one or more presenters can navigate the scenes and beats of the 3D presentation to deliver the 3D presentation to one or more audience members wearing augmented reality headsets.

20 Claims, 17 Drawing Sheets

Related U.S. Application Data continuation of application No. 15/881,538, filed on Jan. 26, 2018, now Pat. No. 10,438,414.

(51) Int. Cl.

| | |
|---|---|
| *G06F 3/01* | (2006.01) |
| *G06F 3/04815* | (2022.01) |
| *G06Q 10/00* | (2023.01) |
| *G06Q 10/10* | (2023.01) |
| *G06T 13/20* | (2011.01) |
| *G06T 17/20* | (2006.01) |
| *G06T 19/00* | (2011.01) |
| *G06T 19/20* | (2011.01) |

(52) U.S. Cl.
CPC ......... *G06F 3/04815* (2013.01); *G06Q 10/00* (2013.01); *G06Q 10/10* (2013.01); *G06T 13/20* (2013.01); *G06T 17/20* (2013.01); *G06T 19/20* (2013.01); *G02B 2027/0138* (2013.01); *G02B 2027/014* (2013.01); *G06F 3/017* (2013.01)

(58) Field of Classification Search
CPC .. G06T 2219/2016; G06F 3/011; G06F 3/017; B25J 9/1694; B25J 9/161; G05B 2219/39451; G05B 19/409
USPC .......................................................... 345/418
See application file for complete search history.

(56) References Cited

U.S. PATENT DOCUMENTS

| | | | | |
|---|---|---|---|---|
| 9,620,167 | B2* | 4/2017 | Patrick ................. | G11B 27/031 |
| 10,799,792 | B2* | 10/2020 | Rios ...................... | A63F 13/332 |
| 10,996,915 | B2* | 5/2021 | Kim ..................... | G06T 19/006 |
| 11,024,085 | B2* | 6/2021 | Kim ........................ | G06F 3/017 |
| 11,076,120 | B1* | 7/2021 | Mintz .................... | G11B 27/10 |
| 11,450,072 | B2* | 9/2022 | Kim ........................ | G06V 10/94 |
| 2012/0214594 | A1* | 8/2012 | Kirovski ............... | A63F 13/213 |
| | | | | 463/36 |
| 2019/0232500 | A1* | 8/2019 | Bennett ................... | G06F 3/011 |

OTHER PUBLICATIONS

Kilpi K, Elprama SA, Jacobs A. Exploring privacy and trust issues in a future immersive videoconferencing system. In2013 46th Hawaii International Conference on System Sciences Jan. 7, 2013 (pp. 315-324). IEEE.*
Elprama SA, Kilpi K, Demeulemeester A, Jacobs A, Lambert P, Van de Walle R. Getting into the Meeting-Feeling: An Explorative Analysis of Presence in Videoconferencing. InInternational Society for Presence Research Annual Conference held in Philadelphia 2012.*
Palmarini R, Erkoyuncu JA, Roy R, Torabmostaedi H. A systematic review of augmented reality applications in maintenance. Robotics and Computer-Integrated Manufacturing. Feb. 1, 2018;49:215-28.*
Nee AY, Ong SK, Chryssolouris G, Mourtzis D. Augmented reality applications in design and manufacturing. CIRP annals. Jan. 1, 2012;61(2):657-79.*
Kaufmann H. Collaborative augmented reality in education. Institute of Software Technology and Interactive Systems, Vienna University of Technology. Feb. 3, 2003:2-4.*
Ismail AW, Sunar MS. Collaborative augmented reality: multi-user interaction in urban simulation. InVisual Informatics: Bridging Research and Practice: First International Visual Informatics Conference, IVIC 2009 Kuala Lumpur, Malaysia, Nov. 11-13, 2009 Proceedings Jan. 2009 (pp. 382-391). Springer Berlin Heidelb.*
Broll W, Stoerring M, Mottram C. The Augmented Round Table—a New Interface to Urban Planning and Architectural Design. InInteract Sep. 1, 2003.*
Broll W, Lindt I, Ohlenburg J, Wittkämper M, Yuan C, Novotny T, Mottram C, Strothmann A. Arthur: A collaborative augmented environment for architectural design and urban planning. JVRB—Journal of Virtual Reality and Broadcasting. Dec. 13, 2004;1(1).*
Blum L, Wetzel R, McCall R, Oppermann L, Broll W. The final TimeWarp: using form and content to support player experience and presence when designing location-aware mobile augmented reality games. InProceedings of the designing interactive systems conference Jun. 11, 2012 (pp. 711-720).*
"Notice of Allowance Issued in European Patent Application No. 18836441.8", dated Jun. 30, 2022, 2 Pages.

\* cited by examiner

AUTHORING AND PRESENTING 3D PRESENTATIONS IN AUGMENTED REALITY

CROSS-REFERENCE TO RELATED APPLICATIONS

This application is a continuation of U.S. patent application Ser. No. 16/583,479 filed on Sep. 26, 2019, and titled "AUTHORING AND PRESENTING 3D PRESENTATIONS IN AUGMENTED REALITY," which is a continuation of U.S. patent application Ser. No. 15/881,538 filed on Jan. 26, 2018, and titled "AUTHORING AND PRESENTING 3D PRESENTATIONS IN AUGMENTED REALITY," which the entire contents of which is incorporated herein by reference.

BACKGROUND

Generally, augmented and virtual reality technologies allow users to experience content in three-dimensional ("3D") using some kind of display (e.g., in a head-mounted or hand-held device) capable of presenting virtual 3D environments from different perspectives. For example, a head-mounted or hand-held display might present a 3D scene from a perspective that changes depending on the orientation of the display. Augmented reality systems can combine real and virtual objects to allow the two to interact. For example, augmented reality systems can layer digital content on top of real world content appearing in the display. Some augmented reality systems like MICROSOFT HOLOLENS® utilize a headset that allows a user to view the real world through a transparent optical component (such as a lens) while 3D virtual images are projected and reflected toward the user's eye, effectively overlaying the 3D virtual images on top of what the user sees in the real world. A 3D environment can be generated that includes a 3D model of the real world and 3D assets representing virtual objects. As such, the 3D environment can be used to manage the relationship between the 3D assets and the real world, and the 3D assets can be used to project 3D virtual images that appear to interact with the real world.

SUMMARY

Embodiments described herein provide methods and systems for authoring and presenting 3D presentations in augmented reality. Generally, 3D presentation software can be provided to permit authors to create 3D presentations that choreograph behaviors of 3D assets into scenes and beats. Generally, a 3D presentation is loaded in various user devices (e.g., author, co-author, presenter, co-presenter, audience member, etc.), and 3D images of the 3D assets and corresponding asset behaviors are rendered among the user devices in a coordinated manner. During an authoring mode, one or more authors can use 3D interfaces (e.g., augmented reality headsets) and/or two-dimensional ("2D") interfaces (e.g., a laptop computer) to generate a 3D presentation. During a presentation mode, one or more presenters can deliver the 3D presentation to one or more audience members wearing augmented reality headsets, by navigating the scenes and the beats of the 3D presentation.

Generally, each user device can generate a virtual 3D environment that includes or is otherwise associated with a 3D room model and the 3D assets in a particular scene or beat. A room alignment can be performed to align a device's virtual 3D environment with the physical room or other space in which the presentation will be delivered. A lobby can be hosted for multiple users to participate in authoring and/or presentation mode. During authoring mode, a host and client co-authors can interact with 3D assets and set asset behaviors, and during presentation mode, designated users can interact with designated 3D assets. Generally, a client can request temporary ownership of a 3D asset from the host to check out the asset and make authorized changes. Asset behaviors that are set by an author during authoring mode can be distributed and stored in an updated 3D presentation file. Changes to a currently rendered asset state, whether in authoring mode or presentation mode, can be distributed substantially in real-time so that each host and client can render the same asset behavior (e.g., viewed from different perspectives) at substantially the same time.

Various visualization tools may be implemented to assist with conveying information in 3D, for example, to generate 3D assets, asset behaviors and/or virtual images. Such visualization tools can include simulator tools, presentation assistant tools, interactive modes and template asset behaviors. Simulator tools can include a perspective simulator that renders a visualization of an audience perspective, and a dollhouse simulator that renders a miniature model of the presentation room and 3D assets in the room. Presentation assistant tools can include a virtual teleprompter, sensory choreography cues, and sensory triggers. Various interactive modes can be provided. For example, an interactive drawing with light mode can be toggled in authoring or presentation modes, in which users can create 3D drawings that render on multiple user devices. An interactive 3D scrubbing mode can be toggled to allow audience members to navigate the state of a 3D animation forward or backward ("scrub" the 3D animation). Other interactive animations can be toggled such as "be the data" animations in which the locations of various users can impact data visualizations. Finally, various template behaviors can be applied to 3D assets. For example, puppeteering allows one or more authors to record a 3D path for a 3D asset to travel during an animation, and to assign asset behaviors (e.g., audio, particle effects, path visualizations, physical effects, and the like) to a given path segment and/or asset state. Similarly, a 3D volumizer animation can be added to a 3D presentation using a data visualization template to replicate one or more 3D assets to illustrate numerical quantities or comparisons. Data visualization templates can produce static visualizations or dynamic visualizations using any kind of asset behavior, and resulting virtual images and/or 3D animations can be overlaid on virtual representations of real places.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
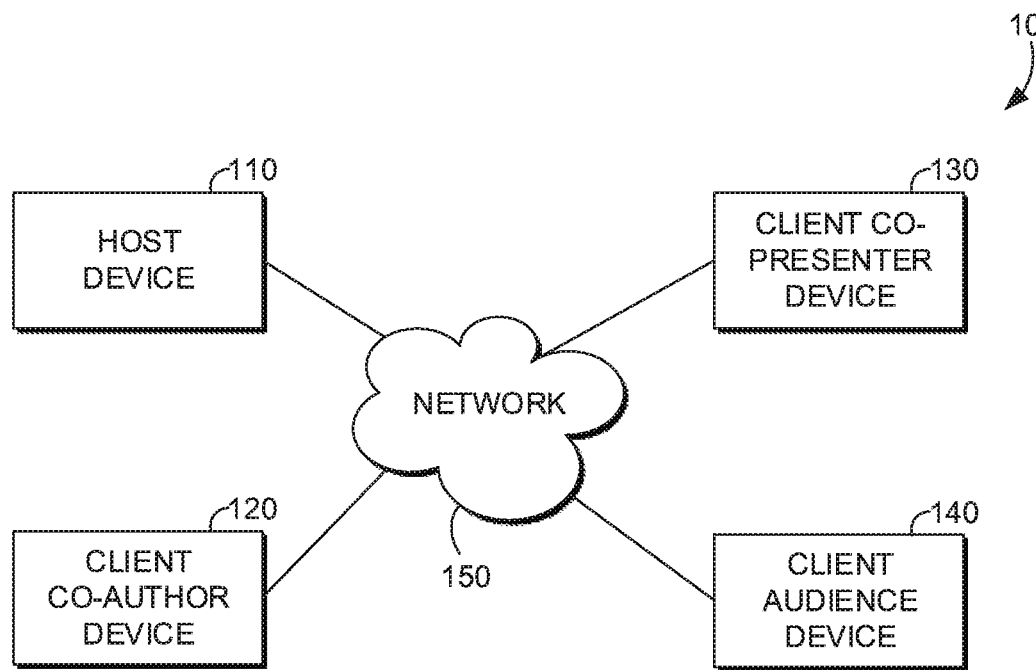
FIG. 1 is a block diagram of an exemplary environment for use in authoring and delivering 3D presentations, in accordance with embodiments described herein.

Conventional 2D presentation software such as MICROSOFT POWERPOINT® allows users to present information by composing and delivering 2D presentations. For example, users can generate 2D presentations with multiple slides that include text and graphics for presentation on a 2D display. However, conventional methods for presenting information in 2D have several shortcomings. Generally, people typically perceive things in 3D, so communication in 2D is an imperfect model for the real world. As such, presenting information in 2D can hinder communication by restricting the efficiency of both expression and perception. For example, when presenting some types of 2D information like 2D images of 3D objects (e.g., a 2D snapshot of a 3D layout or design), some people have difficulty perceiving the missing third dimension, which can negatively impact the effectiveness of a presentation. Moreover, human perception can vary significantly depending on the medium of communication. As such, there may be a lack of consistency among the perceptions among multiple audience members. Finally, presentation in 2D can limit audience engagement, for example, because 2D presentation technology can limit audiences to passive observation.

As such, communication can be improved by authoring and presenting 3D presentations. For example, 3D is a more direct model for the real world and can enhance communication by improving the efficiency of both expression and perception. Similarly, allowing the audience to experience 3D information from different perspectives, and to interact with a 3D object, facilitates hands-on participation that improves learning and engagement. Thus, there is a need for 3D presentation software that allows a presenter to choreograph behaviors of 3D assets in a 3D scene. Similarly, there is a need for 3D presentation software that allows a presenter to create personalized moments for audience members, such as interactive and/or hands-on moments (e.g., where a presenter gives an audience member control of a 3D asset and asks for feedback).

Accordingly, embodiments described herein provide simple and efficient methods and systems for authoring and presenting 3D presentations that choreograph behaviors of 3D assets so each user device can project corresponding virtual images, and each user can see the same asset behavior at substantially the same time. Generally, a 3D presentation file can be generated that includes a 3D room model (or 3D model of some other physical space), 3D assets (e.g., 3D models), and behaviors of the 3D assets (e.g., anchor positions and orientations relative to a 3D environment generated by a user device, fixed or dynamic orientations, triggered static or dynamic states, triggered animations, associated audio, particle effects, path visualizations, physics, transitions, etc.). The 3D presentation choreographs the asset behaviors into scenes and beats of the 3D presentation. Generally, each scene or beat represents a particular arrangement of 3D assets and corresponding asset behaviors. A 3D presentation can have multiple scenes, and a particular scene can have multiple beats. As such, during an authoring mode, one or more authors can set asset behaviors to be triggered at each scene or beat during a presentation mode. The 3D presentation file can be loaded in an author device, presenter device, and/or audience device, and 3D images of the 3D assets (e.g., 3D virtual images) and corresponding asset behaviors can be rendered among the various user devices in a coordinated manner. As such, an author or presenter can navigate the scenes and the beats of the 3D presentation using various navigation commands.

Generally, a 3D presentation environment is provided that supports spatial authoring using a 3D interface (an augmented reality or virtual reality headset that detects user gestures and/or controller inputs) and/or using a 2D interface (e.g., on a laptop). Generally, spatial authoring refers to the process where an author sets asset behaviors for 3D assets, for example, by arranging positions and orientations of 3D assets within a 3D environment, setting other behavior parameters for the asset behaviors, adding template behaviors, and the like. The 3D presentation environment supports multiple co-authors simultaneously authoring, whether in the same room or remotely located (e.g., using avatars to simulate the presence of remote users). As such, spatial authoring can be performed to set behavior parameters for asset behaviors to be triggered by a given scene or beat. In one embodiment, each author has a head-mounted display that can render 3D images (e.g., 3D virtual images) of the 3D assets and corresponding behaviors in a coordinated manner so that the authors see the same asset behaviors at substantially same time. Likewise, the 3D presentation environment supports multiple co-presenters delivering a 3D presentation to multiple audience members. In one embodiment, each presenter and audience member has a head-mounted display that can render 3D virtual images of the 3D assets and corresponding behaviors in a coordinated manner so that the presenters and audience members see the same asset behaviors at substantially same time.

Generally, each user device can generate a virtual 3D environment that operates as a frame of reference (e.g., a coordinate system and origin) for the user device. In order to align virtual images of 3D assets with a room or space in which a presentation will be delivered ("presentation room"), an author setting up a 3D presentation file can generate or otherwise access a 3D model of the presentation room (e.g., a 3D room model), for example, by scanning the room, automatically detecting a pre-mapped room, manually entering room settings, and the like. The 3D room model can be incorporated into or otherwise associated with the virtual 3D environment of the user device, with a location and orientation set relative to the virtual 3D environment of the user device, for example, using a virtual room anchor. 3D assets of a 3D presentation can be tethered to a fixed position in the virtual 3D environment, for example, using virtual object anchors. The 3D room model, virtual room anchor, 3D assets, and virtual object anchors can be accessed by or distributed to each user device (e.g., via the 3D presentation file). As such, each user device can be provided with an awareness of surfaces in the room and 3D assets of the 3D presentation, for example, so the user device can render corresponding virtual images in a manner that avoids or snaps to known surfaces.

In embodiments where one or more of the user devices is an augmented reality (AR) headset in which the user can see the actual physical room or space in which a presentation is being authored or presented (e.g., through a transparent optical component), a corresponding 3D room model does not need to be rendered for those headsets. However, in this scenario, the virtual 3D environment of an AR headset can be aligned with a physical room or space, for example, by adjusting one or more room settings. This can be done manually using a 3D interface (e.g., using one or more gestures to adjust the location of the virtual room anchor, to adjust the orientation of the 3D model, to adjust the location of virtual anchors for moveable walls and/or a moveable table surface, etc.), manually using a 2D interface (e.g., using 3D composition software on a 2D screen), automatically (e.g., by matching detected dimensions/visual features with known dimensions/locations of visual features, matching a detected orientation determined from multiple position measurements with a known orientation of a room, etc.), or otherwise. In one embodiment, once an author has performed a room alignment, some or all of the corresponding room settings are distributed to one or more subsequent user devices (e.g., by saving the settings in a 3D presentation file and distributing the file). In some embodiments, only those user devices that need a room alignment (e.g., AR headsets) are provided with the relevant room settings. As such, a user device can access the room settings to align the virtual 3D environment of that device with the physical room or space. In one embodiment, the room alignment is automatic. Additionally and/or alternatively, some or all of the room settings can be manually adjusted.

Multiple user devices can participate in authoring and presentation modes. To accomplish this, a lobby is provided for multiple users. Generally, a lobby is a virtual staging area in which multiple user devices communicate to facilitate coordinated rendering of a 3D presentation. In some embodiments, one device operates as a host, and the remaining devices operate as clients. The host device distributes a 3D presentation file to client devices, and each client device renders the 3D presentation to view substantially the same asset behaviors at the same time. This can be accomplished, for example, by permitting only the host device to navigate between scenes and beats of a 3D presentation file (e.g., by detecting a navigational command such as a gesture from a host device) and coordinating navigation among the various user devices (e.g., by distributing a triggering signal or message).

During authoring mode, the host and client co-authors can interact with 3D assets and set asset behaviors. During presentation mode, designated users can interact with designated 3D assets. For example, a client can request or be automatically granted temporary ownership of a 3D asset from the host. By way of nonlimiting example, check-in and check-out requests can be initiated using one or more detected inputs such as gestures. If approved, the user can take temporary ownership of the 3D asset and make authorized changes. Asset behaviors that are set by an author during authoring mode (e.g., asset locations and orientations, fixed or dynamic orientations, recorded paths, etc.) can be distributed and stored, for example, in an updated 3D presentation file. Changes to a currently rendered asset behavior (e.g., changes to the current state of a 3D asset), whether in authoring mode or presentation mode, can be distributed substantially in real-time so that each host and client can render the same asset behavior (e.g., viewed from different perspectives, the same perspective, etc.) at substantially the same time.

Some features may be restricted during presentation mode (e.g., recording asset behaviors) for some or all users, while other features may be selectively enabled during presentation mode (e.g., permitting audience members to scrub a designated 3D animation). Accordingly, different profiles or privileges can be set up to differentiate among groups of users (e.g., co-presenters vs. audience, sub-groups of the audience, etc.) and to provide different rights to each group. For example, and as explained in more detail below, a presenter may be able to trigger an interactive mode (e.g., a 3D scrubbing mode) and designated audience members may be permitted to scrub a corresponding 3D animation.

Various visualization tools may be implemented to generate 3D assets, asset behaviors and/or virtual images. Visualization tools can include simulator tools, presentation assistant tools, interactive modes and template asset behaviors. Simulators such as a perspectives simulator can be toggled during authoring mode to simulate audience perspectives (e.g., by rendering 3D frustums of an audience perspective). Additionally and/or alternatively, a dollhouse simulator can be toggled during authoring mode to render a miniature version of the presentation room and the 3D assets in the room. Presentation assistant tools such as a virtual teleprompter that is only visible to a presenter can be added to 3D presentation. Sensory choreography cues can be added to a 3D scene to provide reminders to a presenter (e.g., to move to a location indicated by a visual cue). Sensory triggers (e.g., voice triggers, location triggers, etc.) can be embedded within a 3D presentation to trigger various effects (e.g., a scene or beat transition, an animation, etc.). An interactive drawing with light mode can be toggled in authoring or presentation modes, in which users can create 3D drawings that render on multiple user devices. An interactive 3D scrubbing mode can be toggled to allow audience members to scrub a 3D animation (e.g., an animation of an exploding 3D model). Other interactive animations can be toggled such as "be the data" animations in which the locations of various users can impact data visualizations. Template behaviors can be applied to 3D assets. For example, puppeteering allows one or more authors to record a 3D path for a 3D asset to travel during an animation, and to assign asset behaviors for a given asset state (e.g., audio, particle effects, path visualizations, physics, transitions, etc.). A 3D volumizer animation can be added to a 3D presentation using a data visualization template to illustrate numerical quantities or comparisons. Data visualization templates can use various asset behaviors to produce static and/or dynamic visualizations, and resulting virtual images and/or 3D animations can be overlaid on virtual representations of real places.

As such, 3D presentations can be authored and presented in augmented reality using scenes and beats that choreograph behaviors of 3D assets, spatial authoring using a 3D interface, room alignment, coordinated rendering of virtual images among user devices, and various visualization tools including a virtual teleprompter, sensory cues and triggers, drawing with light mode, a 3D scrubbing mode, a "be the data" mode, puppeteering animations, and 3D volumizer animations.

Exemplary 3D Presentation Environment

Referring now to FIG. 1, a block diagram of exemplary environment 100 ("3D presentation system") suitable for use in implementing embodiments of the invention is shown. Generally, environment 100 is suitable for augmented reality, and, among other things, facilitates authoring and delivering 3D presentations. Environment 100 includes a host device (e.g., host device 110) and one or more client devices (e.g., client co-author device 120, client co-presenter device 130, client audience device 140). Generally, each host and client device is capable of composing augmented reality images comprising a real-world scene with one or more virtual images superimposed on top. For example, the host and client devices can be any kind of computing device capable of facilitating augmented reality such as computing device 1700 of FIG. 17. More specifically, the host and client devices can be a head-mounted display (e.g., a VR or AR headset), a personal computer (PC), a laptop computer, a workstation, a mobile computing device, a PDA, a cell phone, a combination thereof, or the like. In one embodiment, at least one host or client device is an AR headset such as head-mounted display 1502 of FIG. 15 and the head-mounted display described below with respect to FIG. 16. Although embodiments below are described with reference to multiple AR headsets, any combination of devices is possible.

Generally, the components of environment 100 communicate with each other via network 150, which may include, without limitation, any wired and/or wireless protocol (e.g., HDMI, USB, WiFi, Bluetooth, etc.). Additionally and/or alternatively, network 150 may include one or more local area networks (LANs) and/or wide area networks (WANs). Such networking environments are commonplace in offices, enterprise-wide computer networks, intranets, and the Internet. Although the components of environment 100 are described in the context of a host-client configuration, other variations of communication techniques and configurations will be understood by those of ordinary skill in the art, and may be implemented within the present disclosure.

Figure 2:
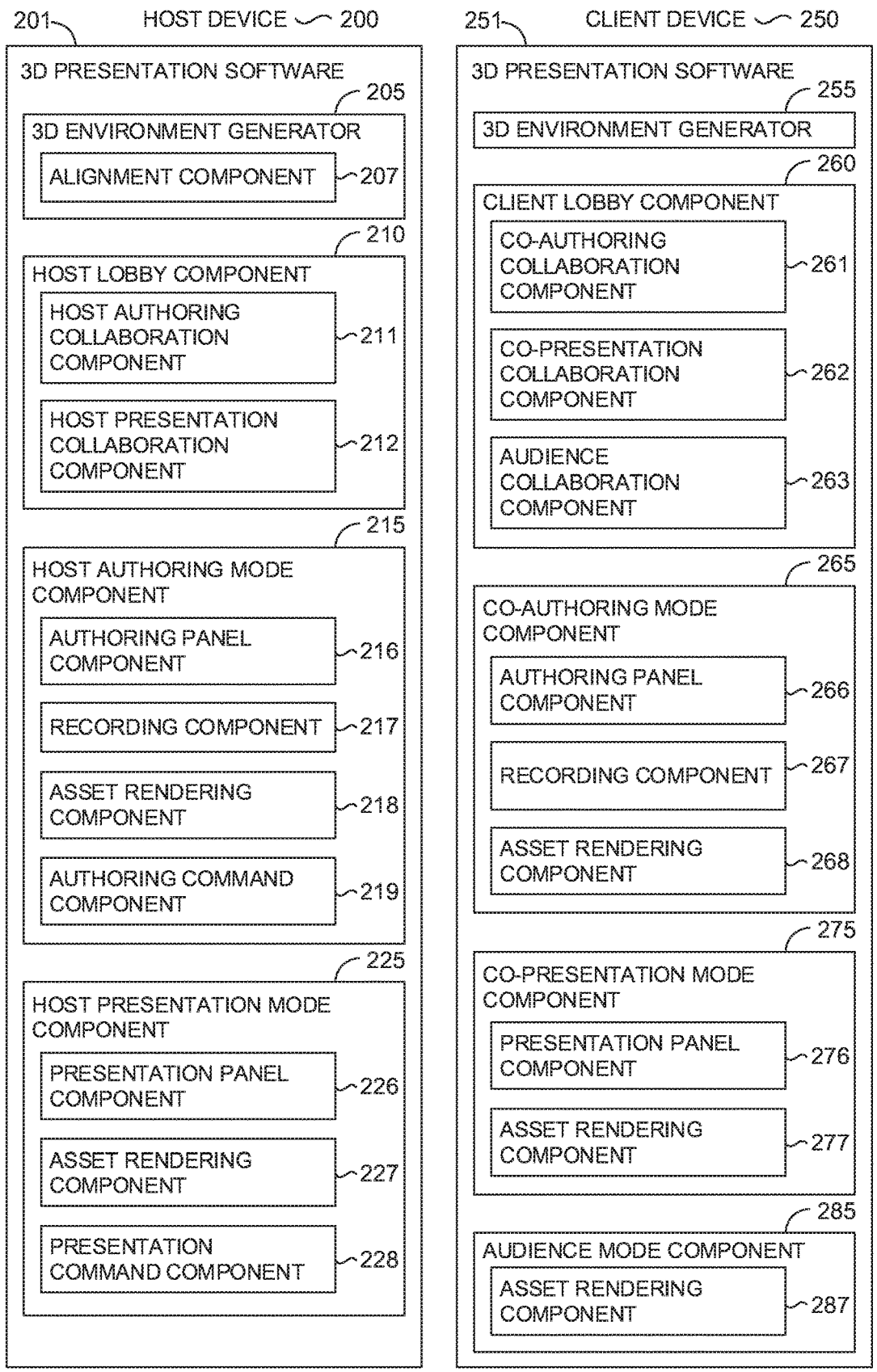
FIG. 2 is a block diagram of exemplary host and client devices, in accordance with embodiments described herein.

Referring now to FIG. 2, FIG. 2 depicts exemplary host and client devices. In one embodiment, host device 200 and client device 250 are AR headsets, but can be any other device capable of composing augmented reality images. Generally, 3D presentation software is installed or otherwise accessible to each device (e.g., via a distributed computing environment). For example, in the embodiment depicted in FIG. 2, host device 200 includes 3D presentation software 201 and client device 250 includes 3D presentation software 251. In some embodiments, the same 3D presentation software is installed on each device, and different functionality is enabled or disabled depending on the role each device plays. For example, a user operating the 3D presentation software to initiate a 3D presentation may trigger the user's device to operate as a host, and additional users can join the presentation using the same software on their own devices as clients. Similarly, 3D presentation software functionality corresponding to co-author, co-presenter, audience and/or custom roles can be enabled or disabled, for example, based on user accounts, profiles, permissions, privileges, and the like. In some embodiments, dedicated 3D presentation software can be accessed, deployed or otherwise utilized corresponding to a specific role (e.g., host software, audience software, etc.). Generally, the 3D presentation software facilitates authoring and presenting in augmented reality.

In the embodiment depicted in FIG. 2, the 3D presentation software on host device 200 includes 3D environment generator 205, host lobby component 210, host authoring mode component 215, and host presentation mode component 225. In this embodiment, the 3D presentation software on client device 200 includes similar or complementary functionality, for example, via 3D environment generator 255, client lobby component 260, co-authoring mode component 265, co-presenter mode component 275, and audience mode component 285.

When a user (e.g., an author or presenter) initiates a 3D presentation using host device 200 (e.g., by opening a new or existing 3D presentation file), 3D environment generator 205 accesses a 3D room model (or other 3D model of a physical space), generates a virtual 3D environment using the 3D room model, and aligns the virtual 3D environment with a physical room or space, if necessary. A 3D room model is generally a mathematical representation of surfaces in the room or space (e.g., walls, tables, other physical boundaries, etc.). Various types of room models (e.g., wireframe, surface/shell, solid, etc.), modeling techniques (e.g., rational B-spline, primitive, polygonal, etc.), and modeling tools (e.g., 3D scanner, by hand using 3D software programs, etc.) may be utilized. For existing 3D presentations, an associated 3D room model may already exist and can therefore be accessed. For new 3D presentations, a new 3D room model may be generated. Although the term 3D room model is used herein, a 3D model of any physical space may be utilized.

A new 3D room model can be generated automatically, for example, by scanning a room using a 3D scanner, which may be included in host device 200. Additionally and/or alternatively, 3D environment generator 205 can provide an interface (e.g., a 2D or 3D interface) with which a user can manually set or adjust room settings, for example, to define wall location and dimensions, table location and dimensions, quantity of audience members a table sits, etc. In some situations, a presentation will be delivered in a different location than the room in which the presentation is authored (e.g., delivering an off-site sales presentation). In that situation, authoring can be performed in one room and automatically adapted to a different room. For example, a user can arrange virtual object anchors for 3D assets relative to a particular surface of one 3D room model. In this manner, if a modeled surface (e.g., a wall or a table) needs to be adjusted after a presentation has been generated, content moves with it.

In some embodiments, a new 3D room model can be generated by automatically detecting a pre-mapped room. For example, multiple rooms (e.g., conference rooms in an office building) can be modeled, interconnected in a map network, and saved (e.g., locally, remotely, some combination thereof, etc.). When a device enters a mapped room (e.g., a user wearing host device 200 walks into a mapped room), the device can detected one or more features of the room. For example, host device 200 may be able to detect one or more characteristics of room (e.g., by recognizing physical features using on-board sensor(s) such as cameras, by detecting a room identifier using identification technology such as RFID, by detecting room location using positioning systems such as GPS or WiFi, or otherwise). Using the detected room features, 3D environment generator 205 can determine which mapped room the user is in (e.g., by matching a detected physical feature with a known physical feature of a mapped room, by matching a detected room identifier with a known identifier of a mapped room, by matching a detected location with a known location of a mapped room, etc.). Additionally and/or alternatively, a user may be provided with an interface with which to select one of the pre-mapped rooms. As such, 3D environment generator 205 can access an associated 3D room model (e.g., by downloading the appropriate 3D room model).

Generally, host device 200 (e.g., an AR headset) generates or otherwise accesses a virtual 3D environment (e.g., a 3D mesh) using the 3D room model. For example, 3D environment generator 205 can import or incorporate the 3D room model into a virtual 3D environment, or otherwise associate the 3D room model with the virtual 3D environment. In some circumstances (e.g., when host device 200 is an AR device in which a user directly views the real world), 3D environment generator 205 may include or activate alignment component 207 to adjust the room settings to align the virtual 3D environment with the physical room or space in which host device 200 is located.

Alignment component 207 can generate or access a virtual room anchor for the 3D room model. The virtual room anchor is generally a reference point associated with the 3D room model (e.g., the geometric center, some other predetermined location, a customizable location, etc.) and may include a default orientation of the 3D room model. The virtual room anchor can be placed in the virtual 3D environment in a manner that aligns the virtual representation of the room or space with the corresponding physical room or space. For example, alignment component 207 can provide an interface (e.g., 2D or 3D) to manually adjust room settings such as the virtual room anchor position and orientation, wall or table location and orientation, etc. In the 3D example, alignment component 207 can render or otherwise cause the rendering of a virtual image of a virtual room anchor. A user can interact with the virtual room anchor to pick up and move the virtual room anchor (e.g., via a detected input such as a pinching gesture), or otherwise adjust its location in the virtual 3D environment. Similarly, a user can interact with the virtual room anchor to pick up and rotate the virtual room anchor (e.g., via the same or a different detected input used to move the anchor), or otherwise adjust its orientation in the virtual world. In some situations, a 3D room model may not align perfectly with a physical room or space. As such, the interface provided by alignment component 207 may also permit manually adjusting the 3D room model. Room surfaces such as walls and/or tables may be adjustable, for example, by rendering virtual images of room surfaces and corresponding virtual surface anchors, and permitting adjustments to the virtual surface anchors (e.g., using 2D or 3D interfaces) to tune a 3D room model. For example, tuning might be used to adjust room features for a 3D room model that was set up at a different location.

In some embodiments, alignment component 207 automatically aligns the virtual 3D environment with the physical room or space in which the user device is located. For example, a user device (e.g., host device 200) can automatically detect an orientation of the user device (e.g., by detecting the Earth's magnetic and/or gravity fields using magnetic field sensors and/or accelerometers, by recognizing physical features of the room using on-board sensor(s) such as cameras, by taking multiple position measurements using positioning systems such as GPS or WiFi, or otherwise). Using the detected orientation of the user device, alignment component 207 can determine a corresponding alignment, for example, by matching a detected device orientation with a known orientation of a mapped room.

Once a room alignment has been performed for a 3D presentation, changes to the 3D room model and/or corresponding room settings are advantageously saved so they can be distributed to each user device that joins the 3D presentation. For example, the 3D room model and/or corresponding room settings can be saved (e.g., in a 3D presentation file or other associated file or data structure). A client device (e.g., client device 250) that joins the presentation can access the 3D room model and/or corresponding room settings (e.g., using 3D environment generator 255) to generate a corresponding virtual 3D environment for that client device. In some embodiments, some or all of the functionality of a host device's 3D environment generator is available to a client device via 3D environment generator 255 (e.g., manual or automatic alignment). In one embodiment, once a host device has initiated a 3D presentation and performed a room alignment, alignments for client devices (e.g., AR headsets) are performed automatically. As such, a client seeking to join a 3D presentation can simply join a hosted lobby.

When a user (e.g., an author or presenter) initiates a 3D presentation (e.g., by opening a new or existing 3D presentation file), the 3D presentation software on the user's device (e.g., host device 200) can host a lobby in which multiple users can participate in authoring and/or presentation modes. Generally, a hosting component of the 3D presentation software on a host device communicates with a corresponding component of the 3D presentation software on a client device. For example, in the embodiment depicted in FIG. 2, host lobby component 210 (e.g., host authoring collaboration component 211 or host presentation collaboration component 212, depending on the host's role) hosts a lobby in which client 250 can join and participate using client lobby component 260 (e.g., co-authoring collaboration component 261, co-presenter collaboration component 262 and/or audience collaboration component 263, depending on the client's role). Any number of clients can join using any type of compatible device (e.g., AR headset, laptop, VR headset, remotely located device, etc.).

Generally, when a client joins a lobby, the host sends the 3D presentation (e.g., a 3D presentation file) to the client. As such, the host and all clients can collaborate on the same 3D presentation. Generally, the 3D presentation choreographs behaviors of 3D assets so each user device can render corresponding virtual images, and each user can see the same asset behavior at substantially the same time. Users can interact with various 3D assets in a manner that depends on a user's role (e.g., host author, host presenter, client co-author, client co-presenter, client audience member, custom role, etc.). For example, in one embodiment, only the host has control to navigate between scenes and beats in authoring and presentation modes, hosts and client co-authors can interact with 3D assets and set asset behaviors in authoring mode, and any user can interact with a designated 3D asset at a designated time during presentation mode. Other combinations of roles (including custom roles) and corresponding permissions can be implemented. The allocated roles and permissions can be implemented using host lobby component 210 and client lobby component 260.

Access to a particular 3D asset in a 3D presentation can be restricted to one user at a time, and the host can control access to each 3D asset. For example, if a host seeks to interact with a 3D asset, host lobby component 210 (e.g., host authoring collaboration component 211 or host presentation collaboration component 212, depending on the host's role) can determine whether the 3D asset is checked out. If not, the host can check out the 3D asset to take temporary ownership. Similarly, if a client seeks to interact with a 3D asset, client lobby component 260 (e.g., co-authoring collaboration component 261, co-presenter collaboration component 262 and/or audience collaboration component 263, depending on the client's role) can request temporary ownership from the host. Host lobby component 210 can determine whether the 3D asset is checked out and whether the requesting client has an appropriate permission. If the 3D asset is not checked out and the client has permission, host lobby component 210 can grant temporary ownership to the client. The check-out process can be implemented in any number of ways (e.g., using electronic locks, security tokens, role-based access control, etc.), as would be understood by those of ordinary skill in the art.

While a particular user has temporary ownership of a 3D asset, the user can manipulate the 3D asset in various ways, as described in more detail below. Generally, a user with proper permission can set an asset behavior for a particular scene or beat (e.g., adjusting position and orientation, recording a 3D path for a puppeteering animation, etc.) and/or change a currently rendered asset behavior (e.g., changing to the current state of a 3D animation). Generally, changes to certain asset behaviors can be limited to authoring mode (e.g., repositioning 3D assets), while some changes to asset behaviors can be permitted during presentation mode (e.g., scrubbing a 3D animation to change the current state of the animation). When a user is finished manipulating a 3D asset, client lobby component 260 can relinquish control of the 3D asset, for example, by requesting to check-in the asset, returning a lock or token, or otherwise notifying host lobby component 210.

As such, a user with temporary ownership of a 3D asset and proper permission can set an asset behavior or change a currently rendered asset behavior. The asset behavior can be distributed to all users in the lobby in various ways. By way of nonlimiting example, a client device can distribute a file and/or data structure that captures the asset behavior to the host device for distribution to all users in the lobby. Additionally and/or alternatively, a client device can distribute the asset behavior directly to each user in the lobby (e.g., based on a running list of active users distributed among the users in the lobby). A user device receiving an asset behavior set for a particular scene or beat during authoring mode can update a local copy of a corresponding 3D presentation file. Generally, asset behaviors define how a corresponding 3D asset is rendered at a given time to produce a corresponding "asset state" for the 3D asset. Changes to currently rendered asset behaviors (e.g., changes to a current asset state), whether in authoring or presentation mode, are advantageously distributed to all users in a lobby substantially in real-time. As such, each user device can update a rendering of the 3D asset substantially in real-time so each user device can render the same asset state (e.g., viewed from different perspectives, the same perspective, etc.) at substantially the same time.

Implementing a check-out procedure for each 3D asset can facilitate the breakout of content. For example, a particular 3D asset can be duplicated so that each author has an individual copy (e.g., manually via one or more authoring tools, automatically via a toggled mode, etc.). Each author can take ownership of his or her own copy of the asset, as described above. As such, the authors can interact with different copies of the same asset to view different asset states of the same asset at the same time, while all states remain visible to all users. This type of interactive co-authoring in augmented reality can improve communication and facilitate discussion.

In the embodiment depicted in FIG. 2, authoring mode is implemented using host authoring mode component 215 or co-authoring mode component 265, depending on the user's role. Different functionality can be enabled or disabled on a user's device depending on the role each user plays. For example, in the embodiment depicted in FIG. 2, host authoring mode component 215 and co-authoring mode component 265 both generate an authoring panel (e.g., via authoring panel components 216, 266), permit asset behaviors to be set (e.g., via recording components 217, 267), and render virtual images of 3D assets (e.g., via asset rendering components 218, 268). However, in this embodiment, only host authoring mode component 215 accepts commands to navigate scenes and beats of a 3D presentation (e.g., via authoring command component 219). Other variations of roles (including custom roles), permissions and corresponding functionality can be implemented.

During authoring mode, an authoring panel can be provided (e.g., via authoring panel components 216, 266). The authoring panel can be rendered in 2D or 3D (e.g., on a laptop screen, in a composite augmented reality image, etc.) in any shape or location. In one embodiment, the authoring panel is rendered as a virtual surface in a composite augmented reality image. The authoring panel includes various authoring tools (e.g., designated by buttons, icons, text, thumbnails, etc.) to assist with authoring 3D presentations. For example, the authoring panel can include navigation controls for the 3D presentation, import tools (e.g., for 3D assets, asset behaviors, mapped rooms, etc.), edit tools (e.g., for 3D assets, asset behaviors, mapped rooms, etc.), simulator tools (e.g., perspective simulator, dollhouse simulator, etc.), presentation assistant tools (e.g., for a virtual teleprompter, sensory choreography cues, sensory triggers, etc.), interactive tools (e.g., to toggle interactive modes for drawing with light, 3D scrubbing, a personalized perspective mode, etc.), a panel anchor to position and orient the authoring panel (e.g., fixed relative to the virtual 3D environment, fixed relative to the position of a user device such as an AR headset, etc.), text or graphics describing a current scene, beat, asset, behavior, etc., and the like. Some or all of the authoring tools can be enabled or disabled depending on a user's role.

Generally in authoring mode, as in presentation mode, virtual images of 3D assets are rendered (e.g., via asset rendering components 218, 268) using 3D assets and asset behaviors stored, for example, in a 3D presentation file.

During toggled interactive modes, users with appropriate permissions can request temporary ownership of designated 3D assets to change the currently rendered state of an asset (e.g., by scrubbing a 3D animation), to generate or activate a 3D asset (e.g., by drawing with light to generate a 3D drawing), and the like. In interactive modes, a changed state of an interactive 3D asset (e.g., state of a 3D animation, a defined 3D drawing, etc.) is advantageously distributed to each user device in a lobby substantially in real-time so that each user device can update a rendering of the 3D asset. As such, each user device can render the same asset state (e.g., viewed from different perspectives) at substantially the same time.

Additionally and/or alternatively, asset behaviors for designated 3D assets can facilitate rendering with a fixed orientation (e.g., a consistent orientation relative to a virtual 3D environment) or a dynamic orientation (e.g., an orientation that can change, for example, based on the location of a user device). For example, a designed asset 3D can be set up in a 3D presentation to always have a fixed orientation (e.g., so users viewing a rendering from different locations will view from different perspectives) or a dynamic orientation (e.g., so any user will view a rendering from the same perspective, regardless of a user's location). In some embodiments, a personalized perspective mode can be toggled by a user with appropriate permission to toggle the orientation of one or more designed assets (e.g., between a fixed and dynamic orientation). As such, a 3D presentation can be authored to render any designated asset from the same perspective at substantially the same time.

In authoring mode, users with appropriate permissions (e.g., host, authors, etc.) can define scenes and beats for a 3D presentation, global parameters (e.g., room settings such as dimensions and lighting, etc.), 3D assets and corresponding asset behaviors associated with a particular scene or beat, and the like. Various asset behaviors can be set (e.g., via recording components 217, 267), including virtual object anchor position, virtual object anchor orientation, fixed or dynamic orientation, triggered static or dynamic states, triggered animations, associated audio, particle effects, path visualizations, physics, transitions, and the like. Generally, authors can set parameters for asset behaviors that form the basis for 3D visualizations. An asset behaviors panel can be provided (e.g., in association with an authoring panel, in association with a particular 3D asset, etc.), rendered in 2D or 3D in any shape or location (e.g., on a laptop screen, in a composite augmented reality image, etc.), and can be activated based on any kind of command input (e.g., a gesture detected in association with a particular 3D asset). A particular asset behavior tool can be selected (e.g., from an asset behaviors panel, using a dedicated command, using a default tool such as a select and move tool, etc.), temporary ownership of a 3D asset can be requested (e.g., if the asset has not already been checked out), and an associated behavior can be set using a 2D or 3D interface. Particular visualization tools for generating 3D assets, asset behaviors and/or virtual images (e.g., simulator tools, presentation assistant tools, interactive modes, template behaviors that can be applied to 3D assets, etc.) are discussed in greater detail below.

In some embodiments, asset behaviors are set by spatial authoring using a 3D interface such as augmented or virtual reality. More specifically, asset behaviors can be set based on 3D inputs to a 3D interface that detects a 3D position, velocity, acceleration and/or orientation of a gesture and/or input device. For example, a user wearing a head-mounted display (e.g., an AR or VR headset) can set asset behaviors by taking temporary ownership of a 3D asset and setting an associated asset behavior using one or more 3D inputs detected using the 3D interface of the head-mounted display (e.g., by moving the asset using a detected gesture such as a pinching gesture, recording a 3D path using a changing 3D input to animate the asset, adding a template behavior to the 3D asset, adding a 3D scrubber to facilitate scrubbing a 3D animation of the asset, etc.).

Figure 3A:
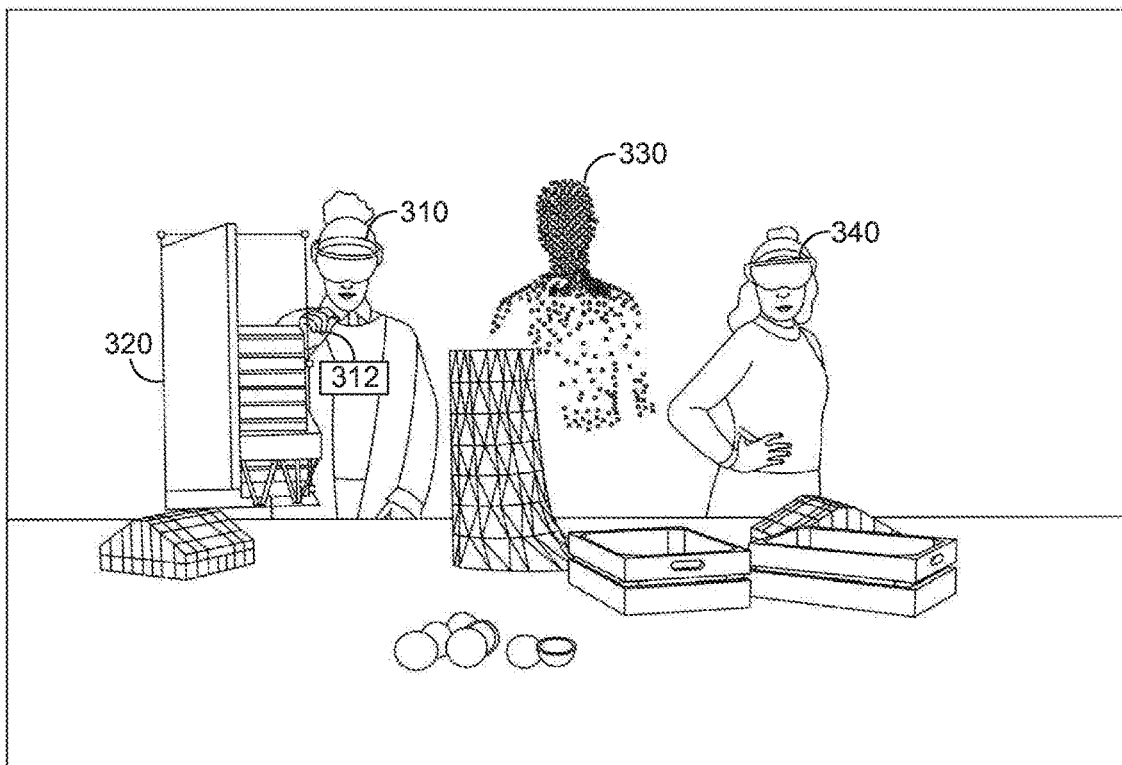
FIGS. 3A-B are illustrated diagrams depicting an exemplary technique for moving a 3D asset using a 3D interface, in accordance with embodiments described herein.
Figure 3B:
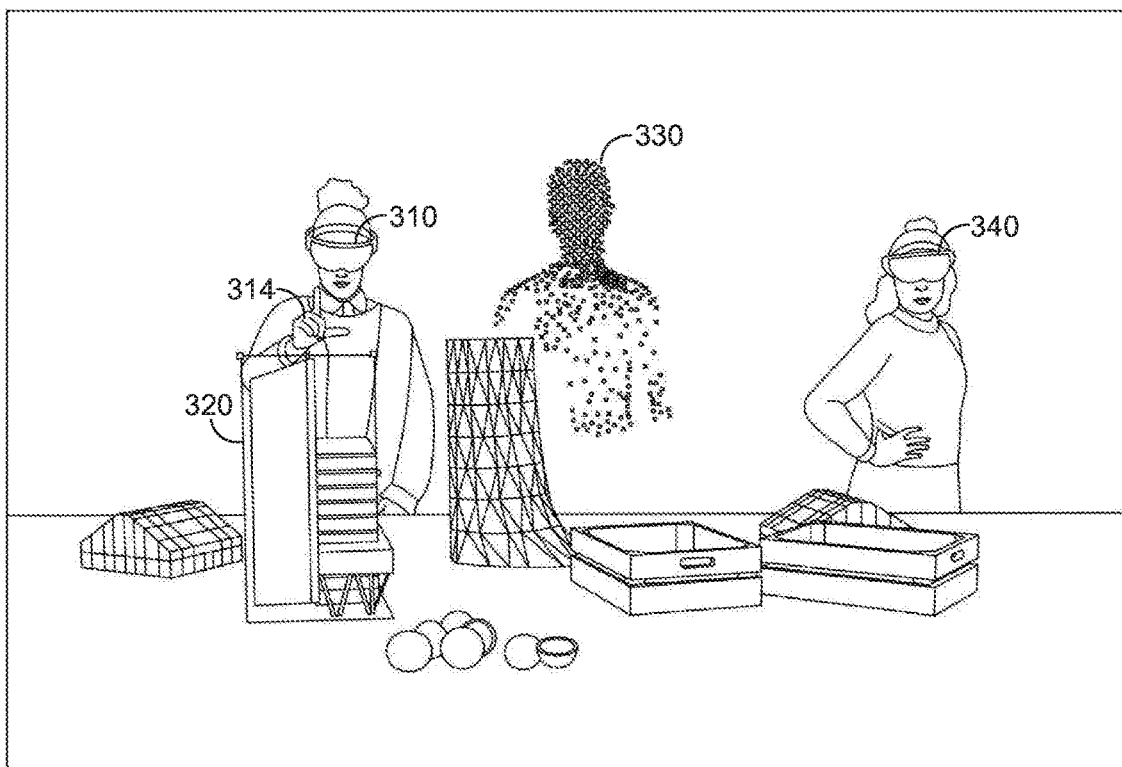

FIGS. 3A-B illustrate an exemplary technique for spatial authoring using a 3D interface to move a 3D asset. In FIGS. 3A-3B, co-authors 310 and 340 are physically present in the same room, and each has an AR headset. Avatar 330 represents the projected location in the room of a remote user wearing a VR headset. In FIG. 3A, co-author 310 picks up virtual image 320 (which can also be understood as picking up the corresponding 3D asset) by positioning her hand 312 relative to virtual image 320 and initiating a pinching gesture. While keeping her fingers pinched, she moves her hand 312 to position 314 in FIG. 3B, releases the pinching gesture, and drops virtual image 320 onto the table. The gesture utilized in FIGS. 3A-3B is meant as an example of spatial authoring using a 3D interface. Other gestures or detected inputs will be understood by those of ordinary skill in the art, and may be implemented within the present disclosure.

In one embodiment, spatial authoring of 3D assets and associated behaviors can be implemented using a combination of 2D and 3D interfaces. Generally, each interface has corresponding benefits. For example, a 3D interface (e.g., an AR headset) can be utilized to perform course adjustments, while a 2D interface (e.g., a laptop with 3D composition software) can be utilized to perform fine adjustments. Generally, spatial authoring using a 3D interface may be advantageous for course adjustments because it removes a layer of abstraction that would otherwise be necessary to perform 3D authoring on a 2D screen. Accordingly, spatial authoring using a 3D interface can be easier and quicker for users to perceive 3D calculus and to manipulate 3D assets over relatively large distances. On the other hand, authoring using a 2D interface may be advantageous for fine adjustments. Manipulating a 3D asset by relatively small distances (e.g., 2 mm right or left) can be a challenging task to perform with free-range 3D movement detected using a 3D interface. Accordingly, spatial authoring using a 2D interface can be quicker and easier for users to perform fine adjustments in a particular dimension. Additionally and/or alternatively, fine adjustments can be performed with spatial authoring using a 3D interface by restricting the degrees of freedom of motion for a manipulation to a selected asset, as would be understood by those of ordinary skill in the art.

Any combination of these interface capabilities can be operationally integrated in a given implementation. More specifically, operationally integrated refers to a configuration of 2D and/or 3D interfaces that manages respective interface inputs, for example, using one or more corresponding control elements (e.g., 2D and/or 3D widgets). In one example, a computer (e.g., a desktop or laptop) may provide 2D control elements, while a 3D input device (e.g., an AR headset) may provide 3D control elements. Software elements corresponding to a given interface can process a corresponding input to permit a user to interact with a particular control element to manipulate a particular 3D asset in a particular manner (e.g., a defined manipulation such as a course or fine adjustment). In various embodiments, more than one input device may be available to manipulate a particular 3D asset. Accordingly, the operationally integrated interfaces can comprise a communication protocol utilized by the interfaces and/or corresponding devices that defines which interface and/or corresponding device may perform a given manipulation in a given scenario. For example, access to a particular 3D asset can be restricted to one interface at a time (e.g., by granting the interface temporary ownership of the 3D asset, as explained in more detail above). As such, asset behaviors can be recorded and choreographed into scenes and beats of a 3D presentation.

Various commands can be detected from a user device with appropriate permission during authoring mode (e.g., via authoring command component 219 of host device 200), and corresponding commands can be distributed to users in a lobby (e.g., all authors). For example, detected commands can include designated gestures, a handheld controller button press, selection of a tool on the authoring panel, sensory triggers, and the like. Generally, navigation commands can be detected from a user device with appropriate permission (e.g., via authoring command component 219 of host device 200) and distributed to some or advantageously all of the users in a lobby in order to navigate scenes and beats of a 3D presentation in a coordinated manner. Likewise, simulator commands can be detected from a user device with appropriate permission and distributed to some or advantageously all of the users in a lobby in order to toggle simulator tools (e.g., perspective simulator, dollhouse simulator, etc.). In some embodiments, interactive assets can be manipulated by users with appropriate permissions during interactive modes (e.g., drawing with light, 3D scrubbing mode, etc.). Commands to toggle an interactive mode can be detected from a user device with appropriate permission and distributed to some or advantageously all of the users in a lobby in order to toggle the interactive mode. Other variations of commands and corresponding control techniques will be understood by those of ordinary skill in the art, and may be implemented within the present disclosure.

In the embodiment depicted in FIG. 2, presentation mode is implemented using host presentation mode component 225, co-presenter mode component 275 or audience mode component 285, depending on the user's role. Different functionality can be enabled or disabled on a user's device depending on the role each user plays. For example, in the embodiment depicted in FIG. 2, each of host presentation mode component 225, co-presenter mode component 275 and audience mode component 285 renders virtual images of 3D assets (e.g., via asset rendering components 227, 277, 287). However, only host presentation mode component 225 and co-presenter mode component 275 generate a presentation panel (e.g., via presentation panel components 226, 276). Moreover, only host presentation mode component 225 accepts commands to navigate scenes and beats of a 3D presentation (e.g., via presentation command component 228). Other variations of roles (including custom roles), permissions and corresponding functionality can be implemented.

During presentation mode, a presentation panel can be provided (e.g., via presentation panel components 226, 276). The presentation panel can be rendered in 2D or 3D (e.g., on a laptop screen, in a composite augmented reality image, etc.) in any shape or location. In one embodiment, the presentation panel is rendered as a virtual surface in a composite augmented reality image. The presentation panel includes various presentation tools (e.g., designated by buttons, icons, text, thumbnails, etc.) to assist with presenting 3D presentations. For example, the presentation panel can include navigation controls for the 3D presentation, presentation assistant tools (e.g., to toggle a virtual teleprompter, sensory choreography cues, etc.), interactive tools (e.g., to toggle interactive modes for drawing with light, 3D scrubbing, etc.), and the like. Some or all of the presentation tools can be enabled or disabled depending on a user's role.

Generally in presentation mode, as in authoring mode, virtual images of 3D assets are rendered (e.g., via asset rendering components 227, 277, 287) using 3D assets and asset behaviors stored, for example, in a 3D presentation file. During toggled interactive modes, users with appropriate permissions can request temporary ownership of designated 3D assets to change the currently rendered state of an asset (e.g., by scrubbing a 3D animation), to generate or activate a 3D asset (e.g., by drawing with light to generate a 3D drawing), and the like. In interactive modes, a changed state of an interactive 3D asset (e.g., state of a 3D animation, a defined 3D drawing, etc.) is advantageously distributed to each user device in a lobby substantially in real-time so that each user device can update a rendering of the 3D asset. As such, each user device can render the same asset state (e.g., viewed from different perspectives, the same perspective, etc.) at substantially the same time.

As in authoring mode, various commands can be detected from a user device with appropriate permission during presentation mode (e.g., via presentation command component 228 of host device 200), and corresponding commands can be distributed to users in a lobby (e.g., all presenters and audience members). For example, detected commands can include designated gestures, a handheld controller button press, selection of a tool on the presentation panel, sensory triggers, and the like. Generally, navigation commands can be detected from a user device with appropriate permission (e.g., via presentation command component 228 of host device 200) and distributed to some or advantageously all of the users in a lobby in order to navigate scenes and beats of a 3D presentation in a coordinated manner. Commands to toggle an interactive mode can be detected from a user device with appropriate permission and distributed to some or advantageously all of the users in a lobby in order to toggle the interactive mode. Other variations of commands and corresponding control techniques will be understood by those of ordinary skill in the art, and may be implemented within the present disclosure.

As such, authors can efficiently and effectively generate 3D presentations that choreograph behaviors of 3D assets, and presenters can efficiently and effectively deliver 3D presentations so that each user sees the same asset behavior at substantially the same time.

Exemplary Visualization Tools

Various visualization tools may be implemented to assist with conveying information in 3D, for example, by generating 3D assets, asset behaviors and/or virtual images. By way of nonlimiting example, visualization tools can include simulator tools, presentation assistant tools, interactive modes and template asset behaviors. Simulator tools can include a perspective simulator and a dollhouse simulator. Presentation assistant tools can include a virtual teleprompter, sensory choreography cues, and sensory triggers. Interactive modes can include drawing with light, a 3D scrubbing mode, and "be the data" animations in which the locations of various users can impact data visualizations. Template behaviors for 3D assets can be applied, for example, to puppeteering animations and 3D volumizer animations.

An example simulator tool is a perspective simulator that simulates an audience perspective. A perspective simulator can be toggled by a user with appropriate permission (e.g., a host, author, etc.), and a resulting simulation of an audience perspective can be rendered on a 2D or 3D interface. For example, one or more audience member models can be placed in a virtual presentation room (e.g., a virtual 3D environment generated based on a 3D model of a presentation room). For a 2D interface (e.g., a laptop), toggling the perspective simulator can render a 2D representation of the virtual presentation room from a perspective originating at an audience member model. For a 3D interface (e.g., an AR or VR headset), toggling the perspective simulator can render a 3D representation of the field of view of the audience member model (e.g., a 3D image of a frustum or other 3D shape). In some embodiments, the perspective simulation (e.g., whether 2D or 3D) can include some variation to account for anticipated natural head movements. In this manner, an author no longer needs to navigate to the location of an expected audience member to preview the audience member's perspective. Instead, an author can immediately visualize the perspective using the perspective simulation. As such, a perspective simulator facilitates efficient authoring that accounts for multiple perspectives.

Another potential simulator tool is a dollhouse simulator that renders a miniature model of a virtual 3D environment (e.g., a miniature version of the presentation room and the 3D assets in the room). A dollhouse simulator can be toggled by a user with appropriate permission (e.g., a host, author, etc.), and a resulting dollhouse simulation can be rendered using a 2D or 3D interface. For example, a miniature model of the virtual 3D environment can be placed at a desired location within the virtual 3D environment (e.g., on a conference room table), and a corresponding virtual image can be rendered so a dollhouse simulation appears at that location in the room. In this manner, an author no longer needs to navigate to the apparent physical location of a virtual image for a particular 3D asset in order to interact with the asset. Instead, an author can interact with a corresponding miniature version of the 3D asset in the dollhouse simulation. As such, a dollhouse simulator facilitates efficient authoring of multiple 3D assets.

Various presentation assistant tools can be provided to assist a presenter in delivering a 3D presentation. Generally, an author can set up a presentation assistant tool during authoring mode, for example, by setting behavior parameters for asset behaviors. As such, during presentation mode, corresponding virtual images can be selectively rendered depending on a user's role. For example, in one embodiment, presentation assistant tools are selectively rendered for a host presenter and/or client co-presenters, but not for audience members. Presentation assistant tools can include a virtual teleprompter, sensory choreography cues, and sensory triggers.

For example, a 3D asset corresponding to a virtual teleprompter can be imported, toggled or otherwise set up during authoring mode. Generally, an author can set up a virtual teleprompter during authoring mode by setting behavior parameters for asset behaviors, including what text to display at a particular scene or beat, the location and orientation of the virtual teleprompter (e.g., fixed relative to the virtual 3D environment, fixed relative to the presentation panel, fixed relative to the position of a user device such as an AR headset, etc.), viewing permissions, and the like. During presentation mode, the virtual teleprompter can be selectively rendered for a host presenter and/or client co-presenters. Virtual teleprompter 430 of FIGS. 4A-D depict an example virtual teleprompter that can be selectively rendered for a presenter.

In some embodiments, sensory choreography cues (e.g., audible, visual, haptic, etc.) can be added to a 3D presentation to assist a presenter in delivering a 3D presentation. Generally, sensory choreography cues can serve as reminders for a presenter during a 3D presentation. For example, assume an author has included a 3D animation of a large aircraft entering the presentation room and landing on a conference room table. If that 3D animation is set up to be triggered at the second beat of a scene, during the first beat of that scene, a 3D asset can be imported, toggled or otherwise set up to remind the presenter where to stand to avoid interfering with the animation. For example, a visual cue can be added at the first beat by selectively rendering a virtual image of a vertical shaft of light during the presentation, indicating to the presenter where to stand before triggering the second beat and the corresponding 3D animation. Other variations of sensory choreography cues can be implemented, as would be understood by those of ordinary skill in the art.

Additionally and/or alternatively, sensory triggers (e.g., voice triggers, location triggers, etc.) can be added to a 3D presentation to assist a presenter in delivering a 3D presentation. For example, instead of or in addition to using navigational controls to trigger scene and/or beat transitions, sensory triggers can be added to the presentation during authoring mode to navigate the presentation during presentation mode. Likewise, sensory triggers can be set up to toggle an interactive mode or trigger one or more asset behaviors. As such, an activated sensory trigger can initiate the defined effect. For example, a virtual location trigger can be placed on the floor of the presentation room in a particular scene or beat, so when a user (e.g., a host, presenter, etc.) walks over and hits the trigger, a corresponding navigational effect (e.g., advance to the next scene or beat), interactive mode (e.g., drawing with light, etc.), or asset behavior (e.g., a triggered animation, etc.) can be initiated. Other variations of sensory triggers can be implemented, as would be understood by those of ordinary skill in the art.

In some embodiments, audience interaction with a 3D presentation, such as the gaze of audience members (e.g., gaze vectors), can be detected and utilized to provide a corresponding visualization (e.g., gaze concentration indicating where the audience is looking during a presentation). In some embodiments, a gaze heat map mode can be enabled to selectively render a 3D gaze heat map (e.g., for a presenter). When enabled, the locations where audience gaze vectors intersect a 3D asset can be lit up, e.g., by rendering a 3D gaze heat map that lights up areas of the 3D asset in a color that indicates the concentration of audience members looking at a given area. As such, a corresponding 3D asset can be provided to users (e.g., presenters) and updated substantially in real-time and/or recorded for subsequent analysis. In this manner, a 3D gaze heat map can provide an author and/or presenter with valuable feedback about which aspects of a 3D presentation appear to be the most (and least) interesting.

In some embodiments, metadata can be generated based on user inputs and associated with a 3D presentation, or aspects of a 3D presentation (e.g., 3D assets). For example, user interaction metadata (e.g., audience gaze metadata, state of audience attention, which 3D assets are picked up, on which side is an asset placed down, etc.) can be recorded and associated with a 3D presentation or corresponding 3D assets. In some embodiments, project-specific audience interaction metadata can be generated and recorded by evaluating audience gaze and/or facial expressions to determine a state of audience attention and/or interest. Additionally and/or alternatively, user annotation metadata can be recorded (e.g., by audience members), for example, during an interactive annotation mode in which users can select a 3D asset or an area of a 3D asset (e.g., a vertex, segment, groups of vertices and/or segments, etc.) and record annotations (e.g., text, audio, etc.). As such, an author and/or presenter can subsequently review metadata to improve 3D presentations.

In some embodiments, metadata associated with a particular 3D asset (e.g., a 3D model) can be hosted publically to aggregate data about particular models. Metadata may but need not be openly editable to facilitate public collaboration. As such, metadata can be distributed to provide an increased understanding of 3D assets.

One or more interactive modes can be provided to facilitate a personalized user experience. For example, an author may set up an interactive mode during authoring mode, for example, by setting behavior parameters for asset behaviors. The interactive mode might be enabled during authoring mode, for example, to facilitate brainstorming. Likewise, the interactive mode might be enabled during presentation mode, for example, to create personalized moments for audience members. Generally, an interactive mode can be enabled in various ways, including by triggering the mode on a particular scene or beat, using a defined toggling gesture, selecting a tool from a panel, etc. Examples of interactive modes include drawing with light, a 3D scrubbing mode, and "be the data" animations in which the locations of various users can impact data visualizations.

In some embodiments, an interactive drawing with light mode can be toggled by a user with appropriate permission, for example, in authoring mode and/or presentation mode. Generally, when the mode is enabled, a user (e.g., each user in the lobby, each user with a selected role, etc.) can generate a time-dependent, free-form 3D drawing using a 3D interface such as augmented or virtual reality. For example, a user can generate a 3D drawing based on a 3D movement of the user detected by a 3D input to a 3D interface (e.g., 3D position, velocity, acceleration and/or orientation of a gesture and/or input device). Generally, a time-dependent 3D drawing captures and updates representative data (e.g., captured in one or more data structures, files, 3D assets, etc.) as the drawing is generated. The data can be distributed to other users in the lobby (e.g., all users) so each user device can render a virtual image of the 3D drawing substantially in real-time (e.g., streaks of light corresponding to the paths of the 3D drawing). For example, a 3D animation can be rendered using a temporary or lasting visualization trail (e.g., trail of light) that tracks the 3D movement of a user input (e.g., a gesture). Generally, an author can set up a drawing with light mode during authoring mode, for example, by setting behavior parameters for asset behaviors. Configurable behavior parameters can include the size and shape of the cross section of visualization trails, the color of the trails, the length or duration of the trails (e.g., whether limited in distance traveled, limited in time, or unlimited), fixed or dynamic orientation, permissions, how to enable the mode (e.g., triggered by a scene or beat, toggling gesture, sensory trigger, etc.), and the like. In some embodiments, editing tools can be provided, for example, to edit lasting 3D drawings. As such, a user (e.g., an author or a presenter) can use a 3D drawing to highlight aspects of a 3D presentation, or otherwise illustrate concepts in 3D.

Figure 4A:
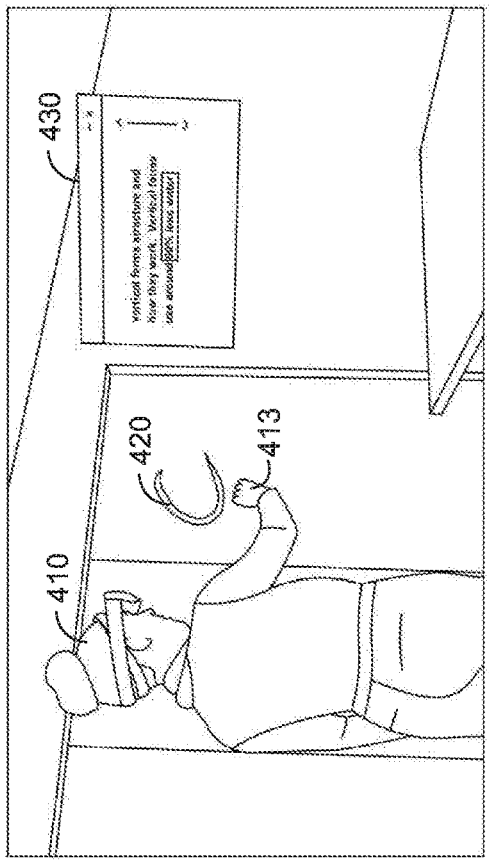
FIGS. 4A-D are illustrated diagrams depicting an exemplary technique for drawing with light using a 3D interface, in accordance with embodiments described herein.
Figure 4B:
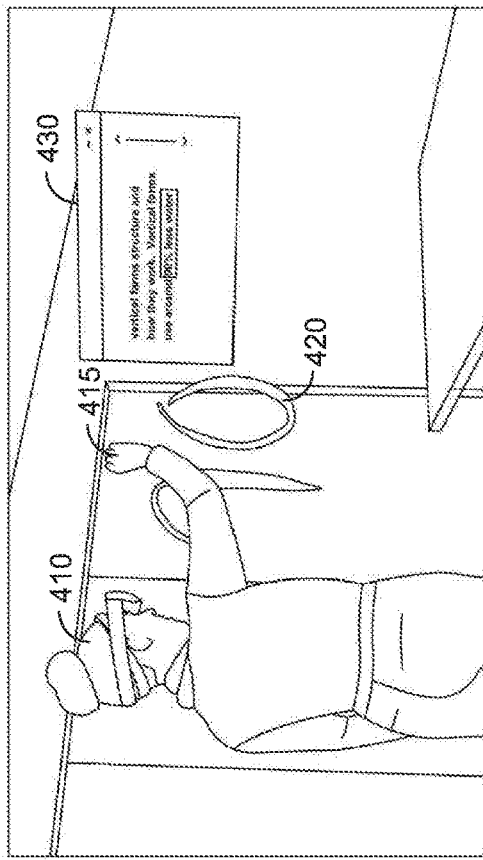
Figure 4C:
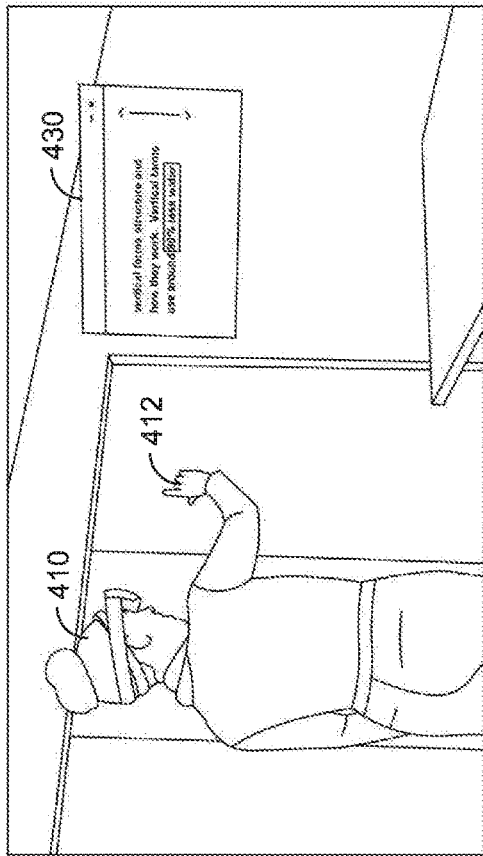
Figure 4D:
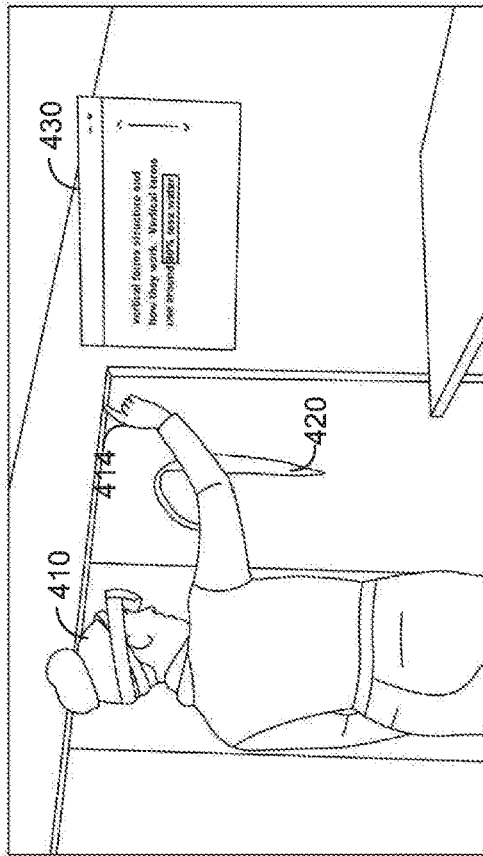

FIGS. 4A-D depict an exemplary technique for drawing with light using a 3D interface. In FIGS. 4A-D, a detected gesture and corresponding visualization trails are depicted sequentially over time from FIG. 4A through FIG. 4D. In these figures, drawing with light mode has been toggled during a 3D presentation in presentation mode. Presenter 410 has an AR headset which projects virtual images into the room, including virtual teleprompter 430. In FIG. 4A, presenter 410 moves her hand to position 412. In this embodiment, presenter 410 initiates a drawing gesture by pinching her fingers and moving her hand through position 413 in FIG. 4B. At substantially the same time, visualization trail 420 is rendered in the headsets of all users who joined the 3D presentation. After drawing the number "9," presenter 410 releases her pinched fingers to finish the gesture and stop drawing. Then, presenter 410 moves her hand to position 414 in FIG. 4C and again initiates a drawing gesture by pinching her fingers and moving her hand through position 415 in FIG. 4D to draw the number "0" with visualization trail 420.

In some embodiments, multiple users can generate 3D drawings at the same time. For example, each permitted user can generate a 3D drawing using that user's device, and each drawing can be distributed to each user device in a lobby. As such, 3D drawings made by any number of users can be rendered on all devices at substantially the same time. Accordingly, the drawing with light mode promotes 3D collaboration and brainstorming.

In some embodiments, the visualization trails can be configured so they do not disappear. By way of nonlimiting example, an interactive spatial storyboarding mode can be provided in which one or more users can sketch and save 3D drawings. In one scenario, an author might outline a 3D presentation by sketching out a 3D storyboard in a room. The author can sketch 3D drawings to indicate desired animations for a particular scene or beat, move throughout the room, and add 3D drawings to indicate transitions, additional scenes or beats, notes, and the like. In some embodiments, a corresponding audio recording can be captured. The 3D drawings and/or audio recording can be replayed at a later time, for example, to bring additional users up to speed. In this manner, an interactive spatial storyboarding mode can improve on conventional 2D whiteboarding techniques. Additionally and/or alternatively, segments of the 3D drawing or the rendering thereof may be edited or replaced, for example, as corresponding 3D asset of a 3D presentation are generated. As such, a 3D storyboard can operate as a skeleton upon which a 3D presentation can be built.

In some embodiments, an interactive 3D scrubbing mode can be enabled or otherwise toggled by a user with appropriate permission, for example, in authoring mode and/or presentation mode. Generally, when the mode is enabled, a user (e.g., each user in the lobby, each user with a selected role, etc.) can navigate the state of ("scrub") a 3D animation using a 3D interface such as augmented or virtual reality. For example, an interactive 3D scrubber tool may be provided that permits multiple users to pick up and move a virtual object (e.g., picking up a virtual icon and moving its location on a playback timeline) to change the state of a corresponding 3D animation substantially in real-time. Any kind of 3D animation can be used, whether imported or generated. For example, template behaviors can be applied to a 3D model, such as rotations, translations, scaling, combinations (e.g., pivoting effects like opening a door, a turntable effect, etc.). Generally, an author can set up a 3D scrubbing animation during authoring mode, for example, by setting behavior parameters for asset behaviors. Configurable behavior parameters can include 3D animation selection (e.g., an imported 3D animation, template behaviors applied to a 3D model, etc.), 3D scrubber design selection (e.g., color, shape, etc.), location and orientation of one or more virtual object anchors to tether the 3D animation and/or associated 3D scrubber, fixed or dynamic orientation, permissions, how to enable the mode (e.g., triggered by a scene or beat, toggling gesture, sensory trigger, etc.), speed of animation and the like. Once the 3D scrubbing mode is enabled (e.g., in presentation mode), users with appropriate permission (e.g., audience members) can scrub the 3D animation by interacting with the 3D scrubber (e.g., making a pinching gesture using a 3D interface to grab the 3D scrubber and scrub through the 3D animation). As such, each user with permission can interact with the 3D scrubber to set the scrubber position to playback the 3D animation.

Figure 5A:
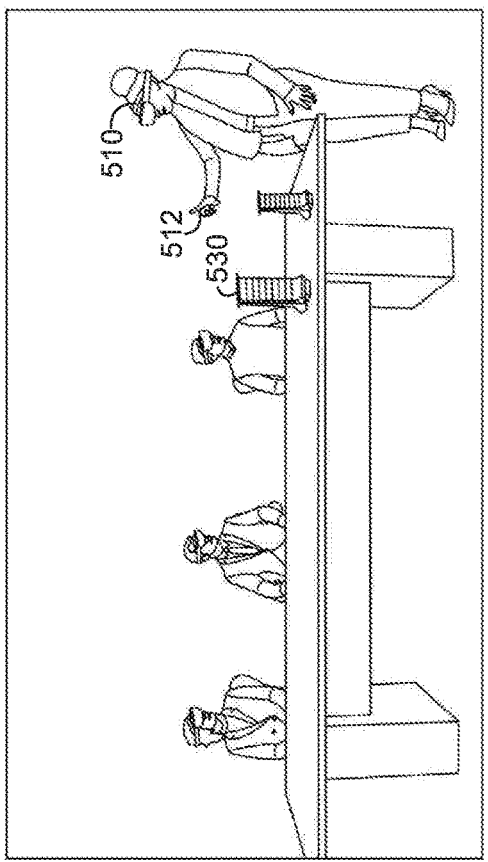
FIGS. 5A-D are illustrated diagrams depicting an exemplary technique for enabling an interactive 3D scrubbing mode using a 3D interface, in accordance with embodiments described herein.
Figure 5B:
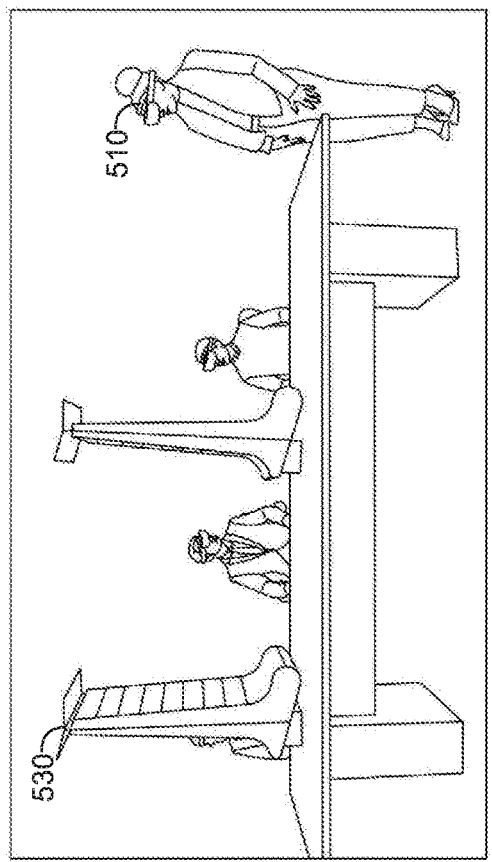
Figure 5C:
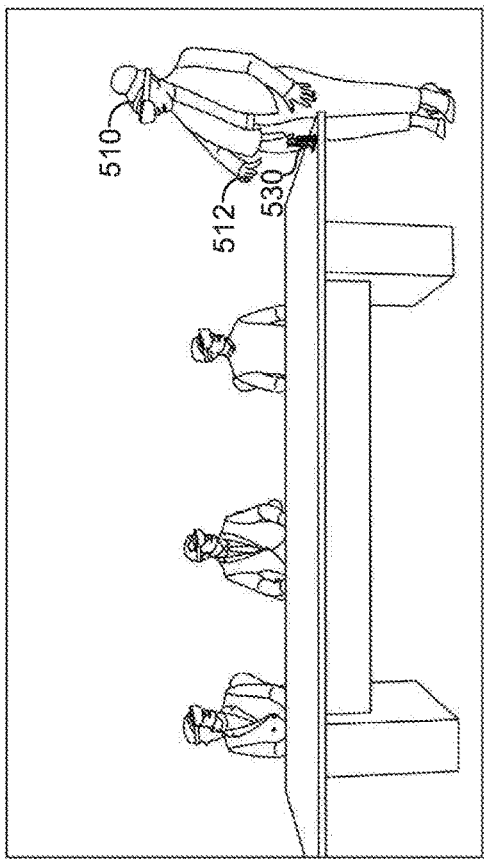
Figure 5D:
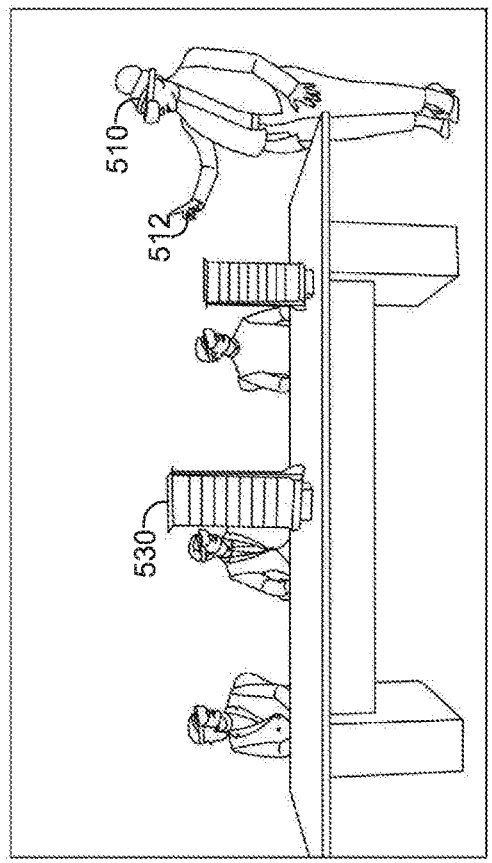

FIGS. 5A-D depict an exemplary technique for enabling (e.g., toggling) a 3D scrubbing mode using a 3D interface. In FIGS. 5A-D, a detected gesture and corresponding visualizations are depicted sequentially over time from FIG. 5A through FIG. 5D. In this embodiment, presenter 510 toggles a 3D scrubbing mode by moving her hand 512 through the positions of a toggling gesture. As the presenter's hand 512 moves through the toggling gesture in FIGS. 5A-5C, a transitional animation 530 is rendered in the headsets of all users who joined the 3D presentation. For example, in FIG. 5A, transitional animation 530 begins at the end of the table where presenter 510 stands. In FIGS. 5B and 5C, transitional animation 530 slides virtual images across the table to rest in front of audience members. At FIG. 5D, the toggling gesture and transitional animation 530 are complete, and 3D scrubbing mode is toggled.

Figure 6A:
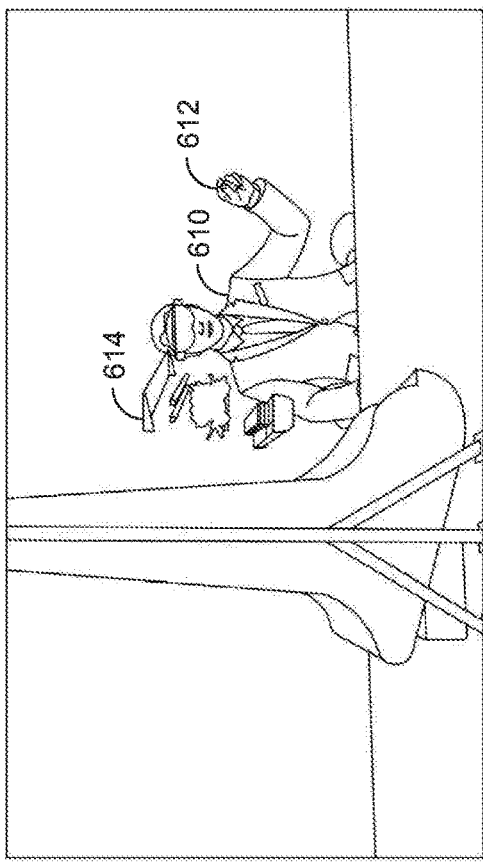
FIGS. 6A-D are illustrated diagrams depicting an exemplary technique for interacting with a 3D scrubber using a 3D interface, in accordance with embodiments described herein.
Figure 6B:
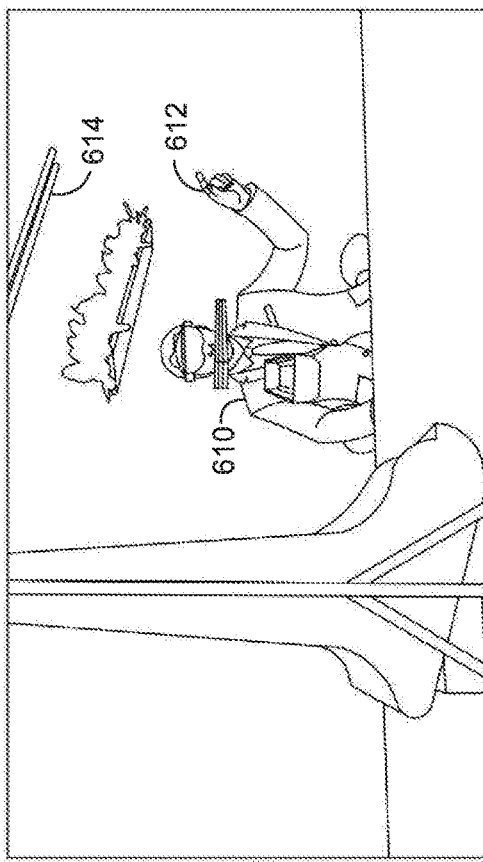
Figure 6C:
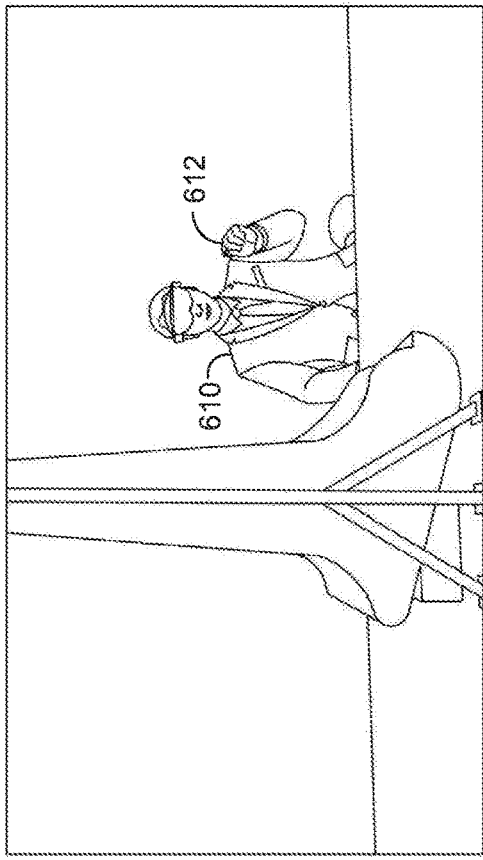
Figure 6D:
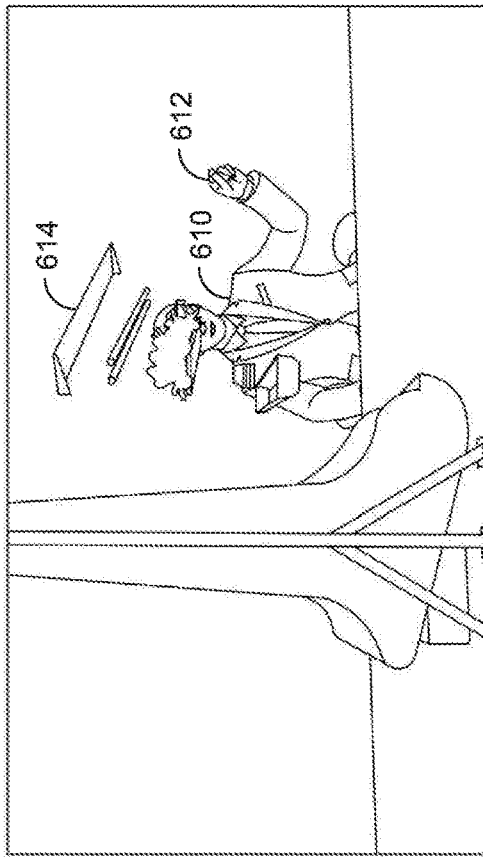

FIGS. 6A-D depict an exemplary technique for interacting with an enabled 3D scrubber using a 3D interface. In FIGS. 6A-D, a detected scrubbing gesture and corresponding visualizations are depicted sequentially over time from FIG. 6A through FIG. 6D. In this embodiment, audience member 610 initiates a scrubbing gesture in FIG. 6A by positioning his hand 612 relative to a 3D scrubber (visible from his perspective, but not illustrated) and pinching his fingers to grab the scrubber. In FIGS. 6B-6C, audience member 610 moves his hand 612 while pinching to scrub 3D animation 614. In this embodiment, 3D animation 614 is a 3D animation of an exploding drawing. As audience member 610 moves his hand 612 through the positions of the scrubbing gesture in FIGS. 6B-6C, 3D animation 614 is rendered and animates in the headsets of each user who joined the 3D presentation. In FIG. 6D, audience member 610 releases the scrubber by releasing his pinched fingers, and the 3D animation 614 stops animating, ending in a state that is determined by the position of the 3D scrubber.

In some embodiments, an interactive "be the data" mode can be enabled or otherwise toggled by a user with appropriate permission, for example, in authoring mode and/or presentation mode. Generally, when the mode is enabled, various users can influence or otherwise control data visualizations for all users using inputs such as user location, gaze, defined gestures and the like. To accomplish this, data visualizations (e.g., 3D assets, virtual images, and/or asset behaviors, etc.) can be associated with one or more users in a presentation room. For example, each audience member can be associated with a piece of data that can be manipulated depending on the audience member's location or gaze in the presentation room. Generally, an author can set up an interactive data visualization during authoring mode, for example, by setting behavior parameters for asset behaviors. Configurable behavior parameters can include data visualization selection (e.g., 3D assets, virtual images, and/or asset behaviors, etc.), type of audience influence (e.g., user location, gaze, defined gestures, etc.), location and orientation of one or more virtual object anchors for the interactive data visualization, fixed or dynamic orientation, permissions, how to enable the interactive mode (e.g., triggered by a scene or beat, toggling gesture, sensory trigger, etc.), and the like. Once the "be the data" mode is enabled (e.g., in presentation mode), users with appropriate permission (e.g., audience members) can carry an influence on or otherwise control a corresponding data visualization that changes dynamically (e.g., substantially in real time) as the designated user input changes.

For example, if an author wanted to illustrate lack of unity in a decision, the author can set up a visualization (e.g., in authoring mode) to illustrate the ratio of the number of proponents to the number opponents in a room. During presentation mode, a presenter can suggest a proposal to the audience and request that everyone in favor stand on one side of the room, and everyone against stand on another side of the room. The locations of each audience member in the room can update a 3D visualization depicting statistics about the decision (e.g., the ratio of yes's to no's) in the headsets of each user. In another example, if an author wanted to illustrate limited resources, the author can set up a visualization (e.g., in authoring mode) to illustrate the work output for potential program initiatives that would result from allocating a variable number of team members to each initiative. The number of audience members in designated areas of the room can update a visualization that illustrates the possible work output corresponding to the chosen allocation. In this manner, the audience can visualize various outcomes and data dependencies, while also seeing audience members in the real world (or their avatars).

In some embodiments, template behaviors can be applied to 3D assets in a 3D presentation to animate 3D assets in a particular manner. Examples of template behaviors include puppeteering animations and 3D volumizer animations.

Generally, puppeteering allows an author in authoring mode to use a 3D interface such as augmented or virtual reality to record a 3D path to animate a selected 3D asset. For example, an author might record a 3D path for a virtual image of a drone quadcopter by enabling a puppeteering recording, picking up the drone using a gesture detected from a 3D interface, moving the drone throughout the room by moving the gesture through a desire 3D path, and dropping the drone at a desired end point by finishing the gesture. The recorded 3D path may be generated with respect to a virtual object anchor for the 3D asset (in this example, the drone). Generally, an author can set up a puppeteering animation during authoring mode, for example, by setting behavior parameters for asset behaviors. Configurable behavior parameters can include the selection of one or more 3D assets to animate, location and orientation of one or more virtual object anchors to tether the puppeteering animation, fixed or dynamic orientation, a 3D path, assignments of asset states to segments of the 3D path, assignment of template behaviors (e.g., animation speed, obstacle avoidance options, particle effects, path visualizations, physical effects, etc.) to segments of the 3D path and/or asset states, how to enable the puppeteering animation (e.g., triggered by a scene or beat, toggling gesture, sensory trigger, etc.), and the like.

Figure 7A:
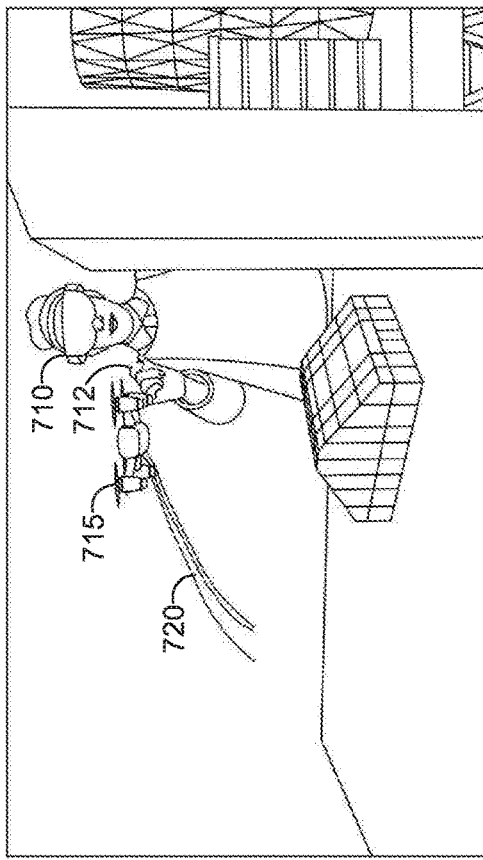
FIGS. 7A-D are illustrated diagrams depicting an exemplary puppeteering recording technique using a 3D interface, in accordance with embodiments described herein.
Figure 7B:
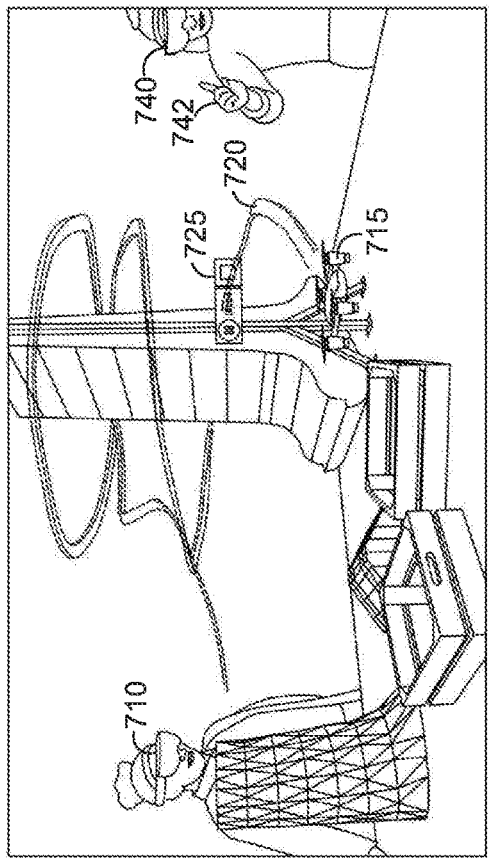
Figure 7C:
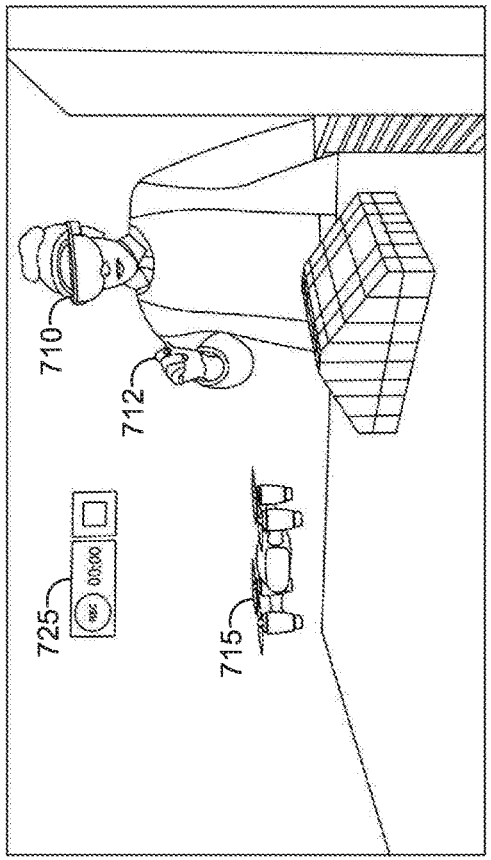
Figure 7D:
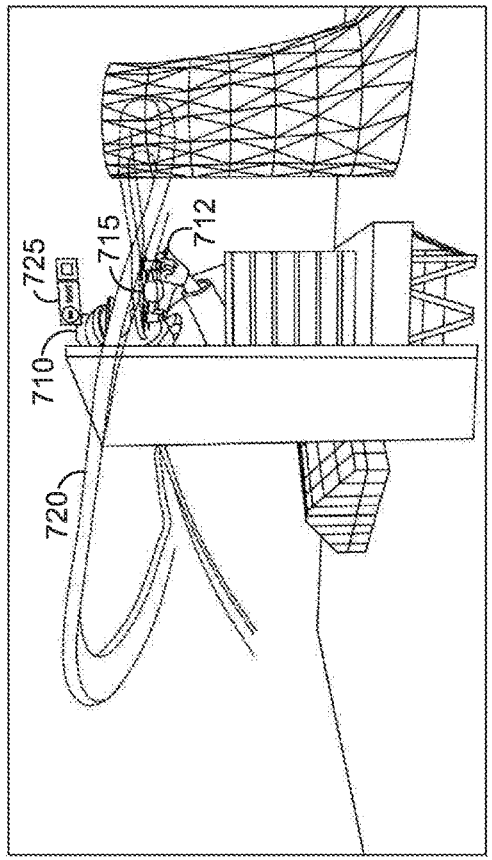

FIGS. 7A-D depict an exemplary puppeteering recording technique using a 3D interface. In FIGS. 7A-D, a recorded 3D path and corresponding visualizations are depicted sequentially over time from FIG. 7A through FIG. 7D. After enabling a puppeteering recording mode, author 710 initiates a puppeteering recording for virtual drone 715 with her hand 712 in FIG. 7A by pinching to grab virtual drone 715. Once the recording is initiated, virtual record timer 725 is rendered in association with virtual drone 715 in the headsets of each author that joined the 3D presentation. As author 710 moves virtual drone 715 throughout the room in FIGS. 7B and 7C, virtual timer 725 moves with virtual drone 715, and recorded 3D path 720 is rendered to reflect the path of virtual drone 715. After FIG. 7C, presenter 710 puts down virtual drone 715 to stop recording. Co-author 740 can then pick up virtual drone 715 with her hand 742 by pinching to grab virtual drone 715 in FIG. 7D. In this manner, multiple authors can record a 3D path for a puppeteering animation.

Generally, any 3D asset can be selected for a puppeteering animation. Some 3D assets may include multiple states, whether static or dynamic. One example 3D asset might be a 3D model of a drone quadcopter with multiple states, including a static ground state, a dynamic take-off state with propellers winding up, a dynamic flying state with propellers spinning, and a dynamic landing state with propellers winding down. Each state can include or otherwise be assigned its own asset behaviors (e.g., an animation such as spinning propellers, corresponding audio, etc.). Generally, different states of a 3D asset can be assigned to a corresponding portion of the puppeteering animation. In some embodiments, a puppeteering animation can support 3D assets with a designated number of states. For example, a puppeteering animation can be generated based on any imported two-state 3D asset (stationary and moving states), a three-state 3D asset (stationary, moving and transitioning states), a four-state 3D asset (stationary, speeding up, moving, and speeding down), or any multi-state 3D asset (e.g., a skeletal animation). As such, a puppeteering animation can be generated based on any type of 3D asset with any number of states.

In some embodiments, a recorded 3D path can be edited, for example, by providing a visualization of the recorded 3D path during authoring mode, segmenting the path, and permitting each segment to be selected and manipulated. In this manner, modifications to the 3D path and associated asset behaviors can be applied to a puppeteering animation, and different behaviors can be applied to different path segments and/or asset states. For example, various template behaviors can be added, such as obstacle avoidance options, particle effects, path visualizations, physical effects, and the like. In some embodiments, obstacle avoidance can be toggled for a particular path segment and/or asset state to avoid obstacles such as room surfaces, 3D assets, etc. Additionally and/or alternatively, particle effects can be attached to selected path segments and/or states of a puppeteering animation. Generally, a particle effect is an incorporation of relatively small (e.g., particle-sized) objects into an animation of a 3D asset (e.g., for an asset state and/or asset behavior). For example, dust particles can be added to a drone taking off and landing. Additionally and/or alternatively, a particle effect can simulate weather patterns such as rain, snow or wind trails can be added. In some embodiments, a visualization of a recorded 3D path can be added for one or more path segments and/or asset states, including a heat map of speed (e.g., red for fast speeds), so that if a puppeteering animation moves too quickly or too slowly, the speed of the recorded 3D path or segment thereof can be revised.

In various embodiments, physical effects can be added to a path segment and/or asset state. Generally, a physical effect is a modification of an animation of a 3D asset (e.g., for an asset state and/or asset behavior) implementing one or more designated physical constraints that define movement behavior through space and/or time (e.g., energy and force behaviors). For example, the Doppler Effect can be added so the faster an animation moves, the larger the change in frequency of an associated audio effect (e.g., the sound of spinning propellers). Similarly, banking and/or smoothing can be applied to represent how an object would behave in real life. For example, a banking animation can be applied to a turning drone, and smoothing can be applied between asset states. Generally, different categories of physical effects can be applied depending on the 3D asset. For example, four wheeled ground vehicles can be set to stay on the ground, such that their movement is limited to two dimensions (e.g., x and z planes). A fish-tailing effect can be enabled to animate some cars to fish tail around corners. Banking can be applied to two wheeled vehicles like motorcycles to animate a motorcycle banking around corners. Flying objects like a drone can be set to permit movement in three dimensions.

Other variations of template behaviors will be understood by those of ordinary skill in the art, and may be implemented within the present disclosure. As such, a puppeteering animation can be generated by recording a 3D path using spatial authoring with a 3D interface, enhanced using template behaviors, and triggered at a designated time in a 3D presentation.

In some embodiments, 3D volumizer animations can be generated to illustrate a numerical quantity or comparison. Generally, a 3D volumizer animation is a 3D visualization comprising 3D image replicates of a selected 3D asset. 3D volumizer animations can be applied to one or more 3D assets to visually illustrate data and provoke an emotional response that may make the underlying data more impactful to an audience. For example, an audience may not fully comprehend what 40,000 unemployed workers look like, so a 3D volumizer animation can generate virtual images of 40,000 people appearing in the parking lot outside the conference room window. Generally, a data visualization template can be defined to replicate a selected 3D asset (e.g., a worker) to generate one or more collections of selected sizes. The data visualization template can be applied to generate virtual images and/or 3D animations of the collections. Data visualization templates can produce static visualizations (e.g., stationary workers) and/or dynamic visualizations (e.g., a swarm of bees), can support different behaviors for different asset states, and resulting virtual images and/or 3D animations can be overlaid on virtual representations of real places and triggered, for example, at a designated scene or beat, by a designated gesture, by a designated sensory trigger, or otherwise.

Generally, 3D volumizer animations apply data visualization templates to 3D assets based on various behavior parameters for asset behaviors selected by an author during authoring mode. Configurable behavior parameters for a data visualization template can include the selection of one or more 3D assets to animate, number of replicates to generate (e.g., corresponding to a data collection to illustrate), origin/entry points and corresponding transitions for 3D volumizer animations (e.g., falling from the ceiling, spawning, exiting through a wall, evaporating, etc.), location and 3D volumes for 3D volumizer animations (e.g., swarms of bees assigned to different volumes of a presentation room), physical effects (e.g., in order to animate a swarm of bees, do not apply gravity, include a wind pattern or other modular effect, etc.), an idle animation (e.g., a flying bee), interactions with data visualizations for additional data collections (e.g., combined visualizations), how to enable a 3D volumizer animation (e.g., triggered by a scene or beat, toggling gesture, sensory trigger, etc.), fixed or dynamic orientation, and the like.

Figure 8A:
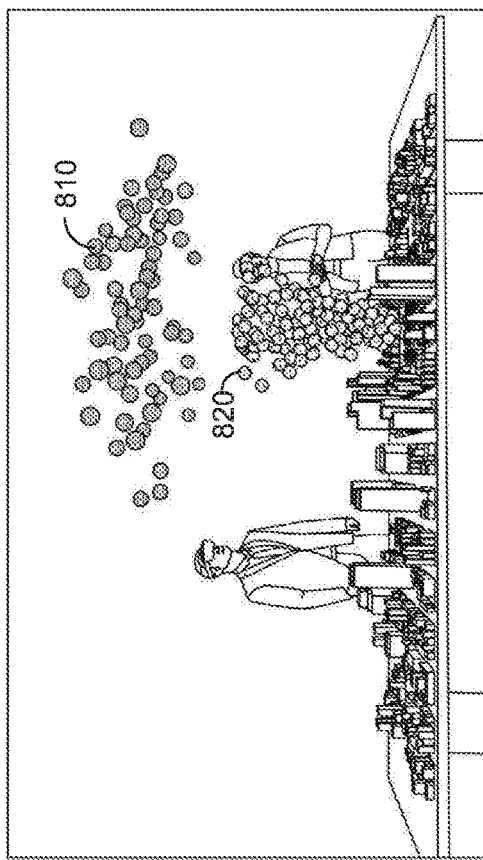
FIGS. 8A-D are illustrated diagrams depicting an exemplary 3D volumizer animation, in accordance with embodiments described herein.
Figure 8B:
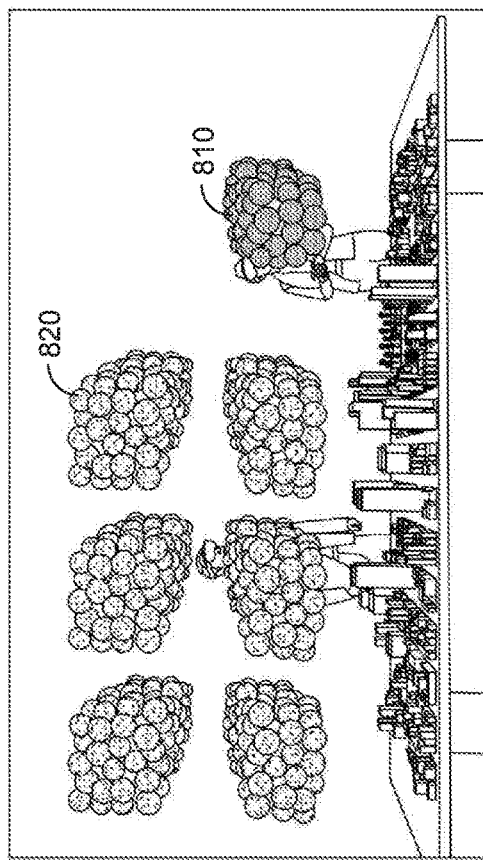
Figure 8C:
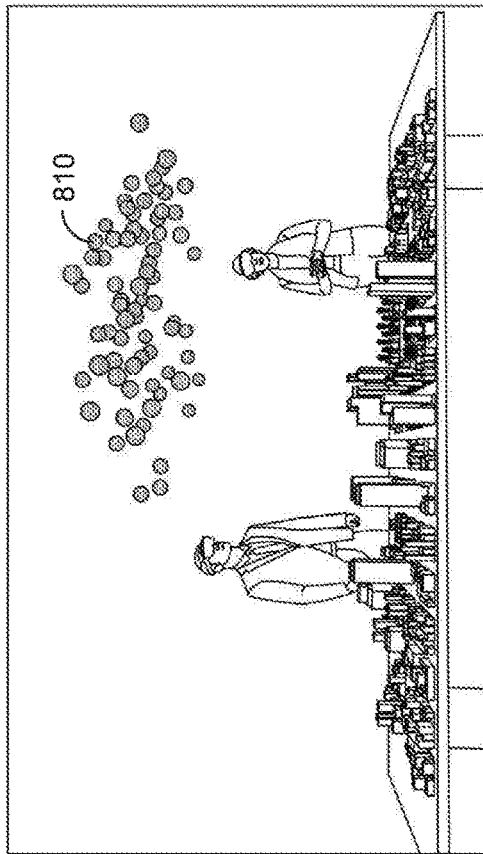
Figure 8D:
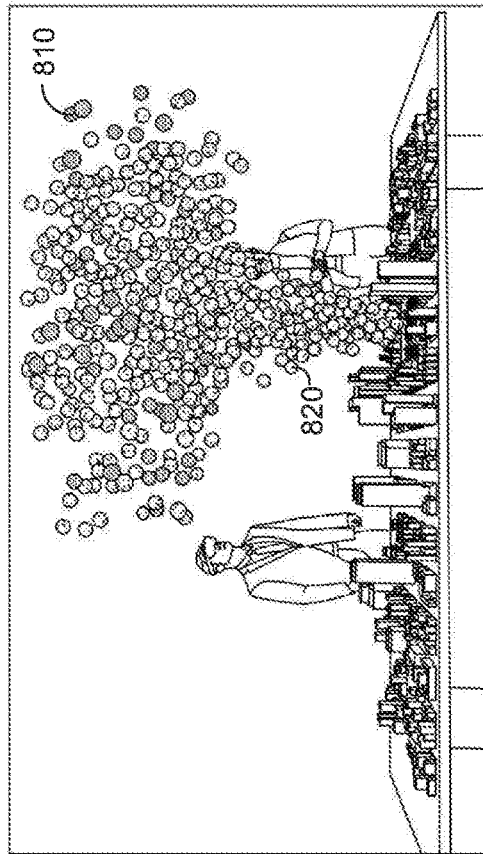

FIGS. 8A-D depict exemplary 3D volumizer animations occurring sequentially over time from FIG. 8A through FIG. 8D. In the 3D scene depicted in FIGS. 8A-8D, a presenter is explaining the potential increase in food output that would result from implementing vertical farming in the city being modeled on the table. In FIG. 8A, the presenter triggered a 3D volumizer animation of a first data collection, collection 810, representing the current food output of the city. At FIG. 8B, the presenter triggers a beat in which a 3D volumizer animation of a second data collection representing the potential food output of the city with vertical farming, collection 820, enters the presentation room through the table. In FIG. 8C, the 3D volumizer animation of collection 820 continues to fill the presentation room and begins to dwarf collection 810. The presenter then triggers a beat in which collections 810 and 820 are spatially arranged in discrete bundles in FIG. 8D. As such, the magnitude of the potential increase in food output can be easily visualized by audience members of the 3D presentation.

Exemplary Flow Diagrams

With reference to FIGS. 9-14, flow diagrams are provided illustrating methods for authoring and presenting a 3D presentation in augmented reality. The methods can be performed using the 3D presentation system described herein. In embodiments, one or more computer storage media having computer-executable instructions embodied thereon can, when executed by one or more processors, cause the one or more processors to perform the methods.

Figure 9:
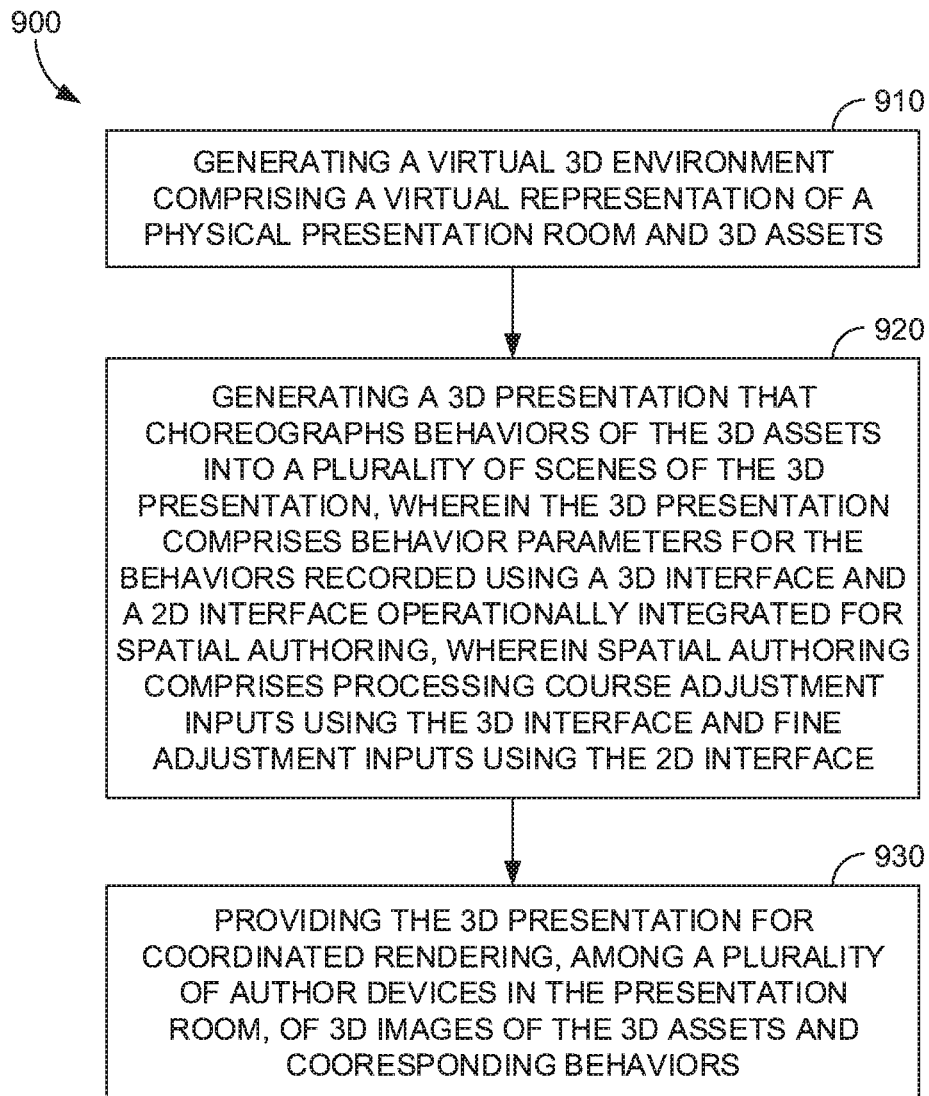
FIG. 9 is a flow diagram showing an exemplary method for authoring and presenting a 3D presentation, in accordance with embodiments described herein.

Turning now to FIG. 9, a flow diagram is provided that illustrates a method 900 for authoring and presenting a 3D presentation. Initially at block 910, a virtual 3D environment is generated. The virtual 3D environment includes or otherwise associates a virtual rendering of a physical room or space. At block 920, the virtual 3D environment is aligned with the physical room or space, for example, automatically using an AR headset. At block 930, a 3D presentation is generated that choreographs behaviors of 3D assets in a plurality of scenes, wherein at least one of the scenes comprises a plurality of beats. The 3D presentation comprises behavior parameters for the behaviors received via spatial authoring using a 3D interface and stored in the 3D presentation in association with corresponding scenes and beats. At block 940, the 3D presentation is provided for coordinated rendering, among a presenter device and a plurality of audience devices in the physical room or space, of virtual images of the 3D assets and corresponding behaviors, wherein the 3D presentation is configured to navigate the scenes and the beats based on a navigation command received from the presenter device.

Figure 10:
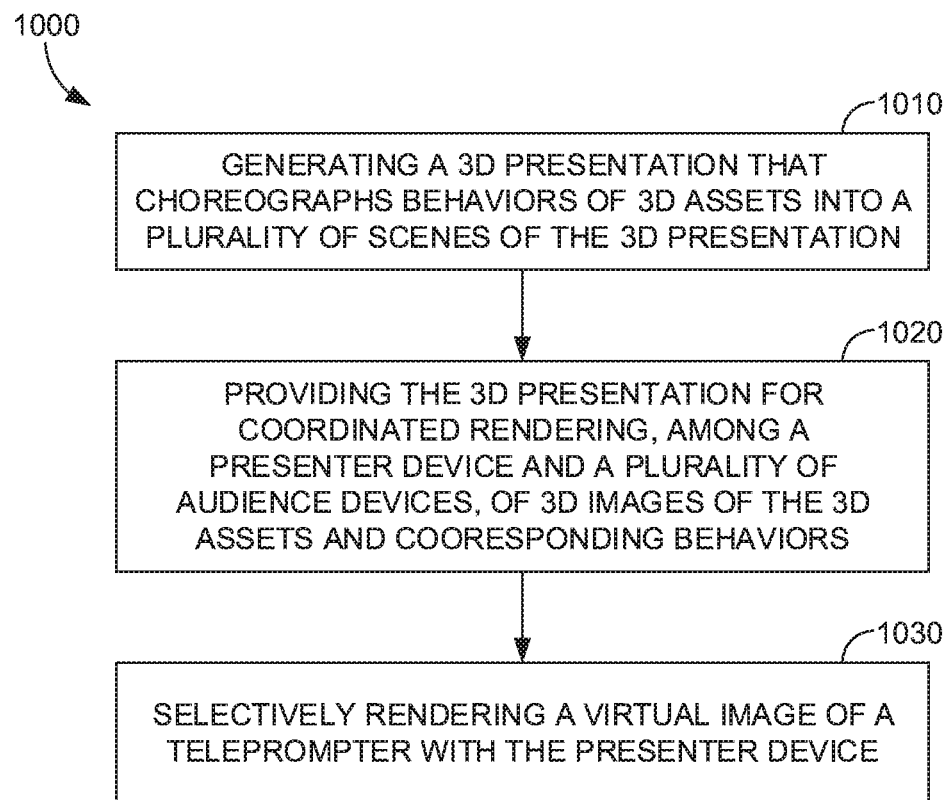
FIG. 10 is a flow diagram showing an exemplary method for providing a virtual teleprompter, in accordance with embodiments described herein.

Turning now to FIG. 10, a flow diagram is provided that illustrates a method 1000 for providing a virtual teleprompter. Initially at block 1010, a 3D presentation is generated that choreographs behaviors of 3D assets in a plurality of scenes. At block 1020, the 3D presentation is provided for coordinated rendering, among a presenter device and a plurality of audience devices, of virtual images of the 3D assets and corresponding behaviors. The 3D presentation is configured to navigate the scenes based on a navigation command received from the presenter device. At block 1030, a virtual image of a teleprompter is selectively rendered with the presenter device.

Figure 11:
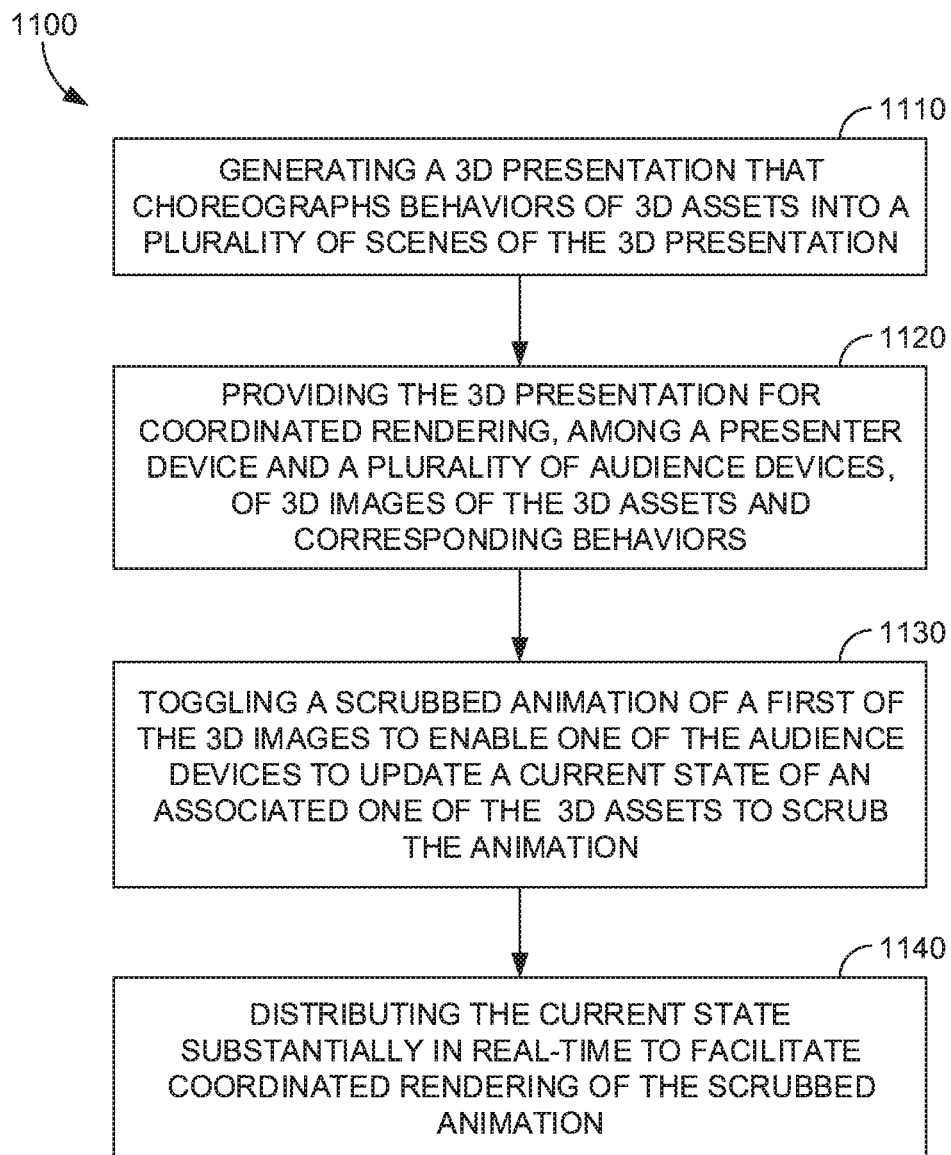
FIG. 11 is a flow diagram showing an exemplary method for providing a 3D scrubber, in accordance with embodiments described herein.

Turning now to FIG. 11, a flow diagram is provided that illustrates a method 1100 for providing a 3D scrubber. Initially at block 1110, a 3D presentation is generated that choreographs behaviors of 3D assets in a plurality of scenes. At block 1120, the 3D presentation is provided for coordinated rendering, among a presenter device and a plurality of audience devices, of virtual images of the 3D assets and corresponding behaviors. The 3D presentation is configured to navigate the scenes based on a navigation command received from the presenter device. At block 1130, a scrubbed animation of a first one of the virtual images is toggled based on a toggling command from the presenter device. The toggling enables one of the audience devices to take temporary ownership of an associated one of the 3D assets and update a current state of the 3D asset to scrub the animation. At block 1140, the current state is distributed to facilitate coordinated rendering of the first virtual image.

Figure 12:
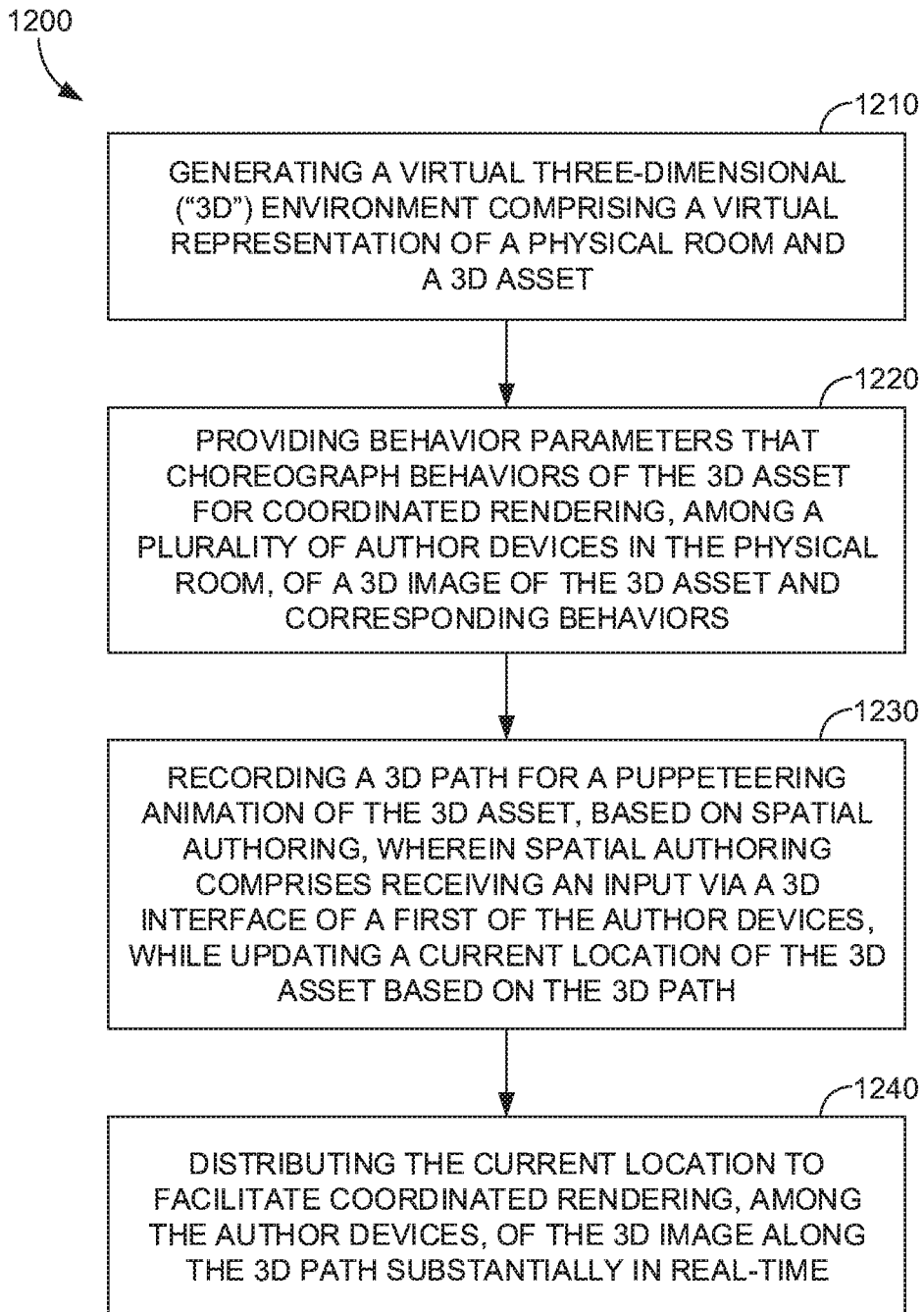
FIG. 12 is a flow diagram showing an exemplary method for puppeteering, in accordance with embodiments described herein.

Turning now to FIG. 12, a flow diagram is provided that illustrates a method 1200 for puppeteering. Initially at block 1210, a 3D presentation is generated that choreographs behaviors of 3D assets in a plurality of scenes. The 3D presentation comprises behavior parameters for a first one of the 3D assets to be triggered by a given one of the scenes. The behavior parameters are received via spatial authoring using a 3D interface and stored in the 3D presentation in association with the given scene. The behavior parameters comprise a recorded 3D path of the first 3D asset received via the spatial authoring. At block 1120, the 3D presentation is provided for coordinated rendering, among a presenter device and a plurality of audience devices, of virtual images of the 3D assets and corresponding behaviors. The 3D presentation is configured to navigate the scenes based on a navigation command received from the presenter device. A first of the behaviors corresponding to the first 3D asset comprises an animation of a corresponding virtual images with a trailing visualization of the recorded 3D path.

Figure 13:
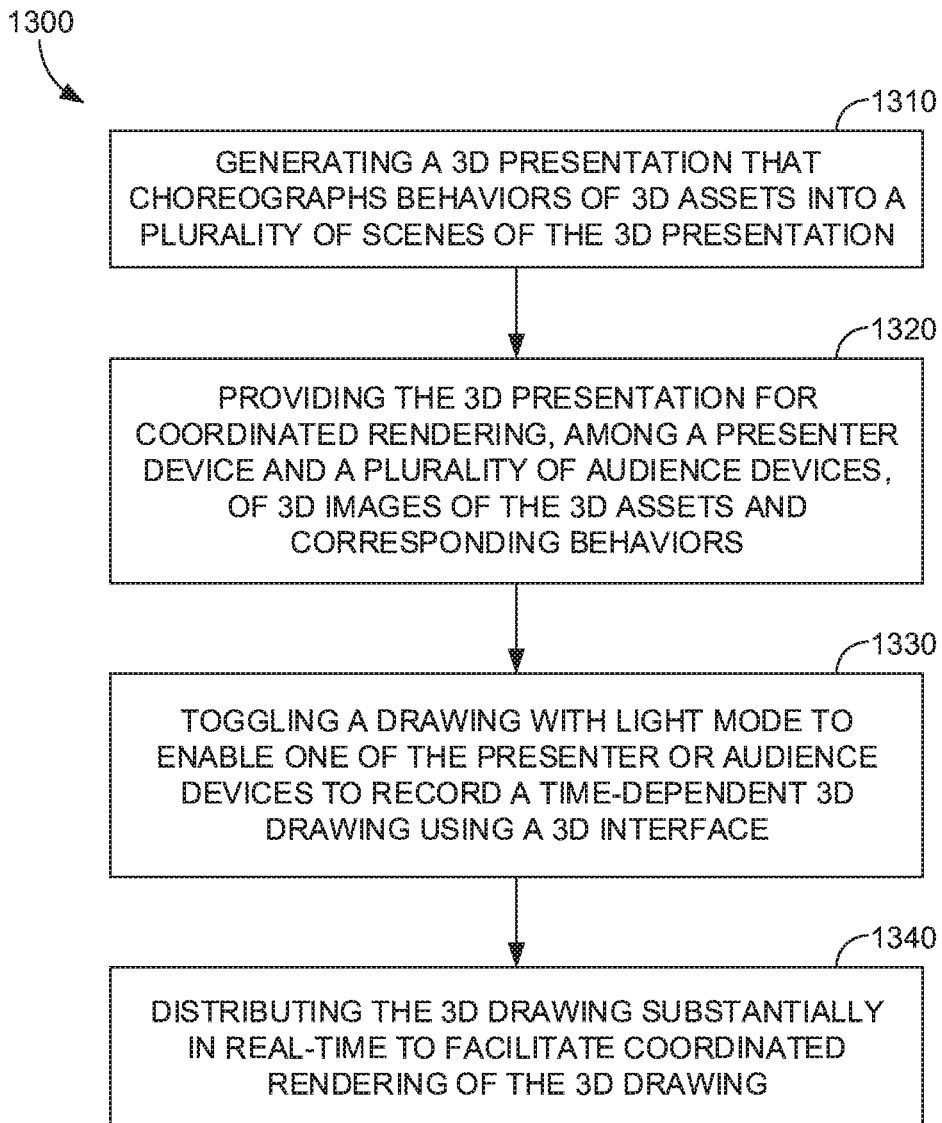
FIG. 13 is a flow diagram showing an exemplary method for drawing with light, in accordance with embodiments described herein.

Turning now to FIG. 13, a flow diagram is provided that illustrates a method 1300 for drawing with light. Initially at block 1310, a 3D presentation is generated that choreographs behaviors of 3D assets in a plurality of scenes. At block 1320, the 3D presentation is provided for coordinated rendering, among a presenter device and a plurality of audience devices, of virtual images of the 3D assets and corresponding behaviors. The 3D presentation is configured to navigate the scenes based on a navigation command received from the presenter device. At block 1330, a drawing with light mode is toggled based on a toggling command from the presenter device. The toggling enables a first of the audience devices to record a selectively time-dependent 3D drawing via spatial authoring using a 3D interface. At block 1340, the recorded 3D drawing is distributed to facilitate coordinated rendering of the 3D drawing with a disappearing trail.

Figure 14:
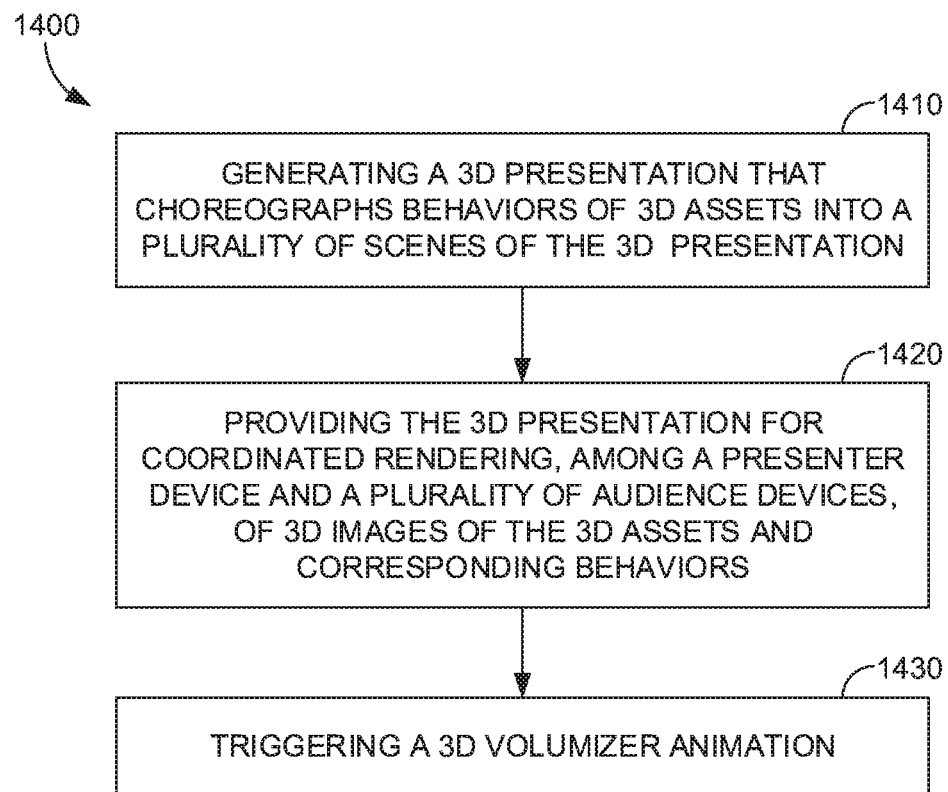
FIG. 14 is a flow diagram showing an exemplary method for providing a 3D volumizer animation, in accordance with embodiments described herein.

Turning now to FIG. 14, a flow diagram is provided that illustrates a method 1400 for providing a 3D volumizer animation. Initially at block 1410, a 3D presentation is generated that choreographs behaviors of 3D assets in a plurality of scenes. The 3D presentation includes, 1410A, first behavior parameters for a first collection of the 3D assets. The first behavior parameters include a first selected 3D model, a first selected quantity of replicates of the first 3D model to be generated for the first collection, and a first selected data visualization template to be applied to the first collection. The 3D presentation also includes, 1410B, second behavior parameters for a second collection of the 3D assets. The second behavior parameters include a second selected 3D model, a second selected quantity of replicates of the second 3D model to be generated for the second collection, and a second selected data visualization template to be applied to the second collection. At block 1420, the 3D presentation is provided for coordinated rendering, among a presenter device and a plurality of audience devices, of virtual images of the 3D assets and corresponding behaviors.

The 3D presentation is configured to navigate the scenes based on a navigation command received from the presenter device. At block 1430, a first set of the behaviors is triggered to visualize the first quantity by animating a first set of the virtual images corresponding to the replicates of the first 3D model using the first data visualization template animation. At block 1440, a second set of the behaviors is triggered to visualize a comparison between the first and the second quantities by animating a second set of the virtual images corresponding to the replicates of the second 3D model using the second data visualization template.

Exemplary Augmented Reality Environment

Figure 15:
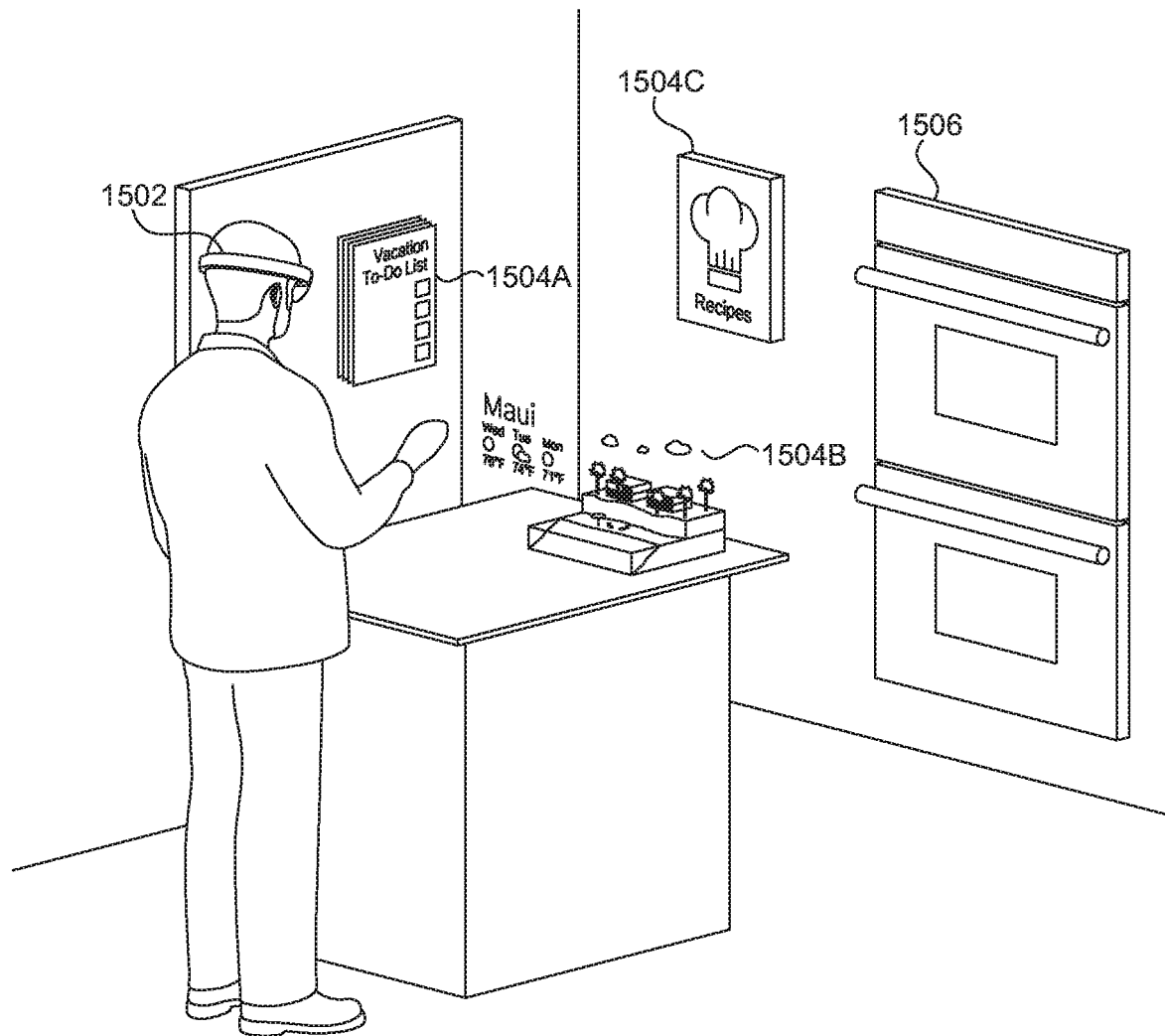
FIG. 15 is an illustrated diagram depicting exemplary augmented reality images of a head-mounted display, in accordance with embodiments described herein.

With reference to FIG. 15, exemplary virtual images generated by a head-mounted display (HMD) are depicted. Generally, a user wears a HMD (e.g., HMD 1502), which permits the user to see the real-world (e.g., background 1506), for example, through a transparent optical component such as a lens. The HMD generates virtual images (e.g., 1504A, 1504B and 1504C) and superimposes the virtual images over the real-world. In this manner, the virtual images can appear to integrate or otherwise interact with the real-world. For example, in the embodiment depicted by FIG. 15, virtual image 1504C is a recipe book icon that appears superimposed on, and hanging in mid-air in front of, the cooking oven and/or wall of background 1506.

Figure 16:
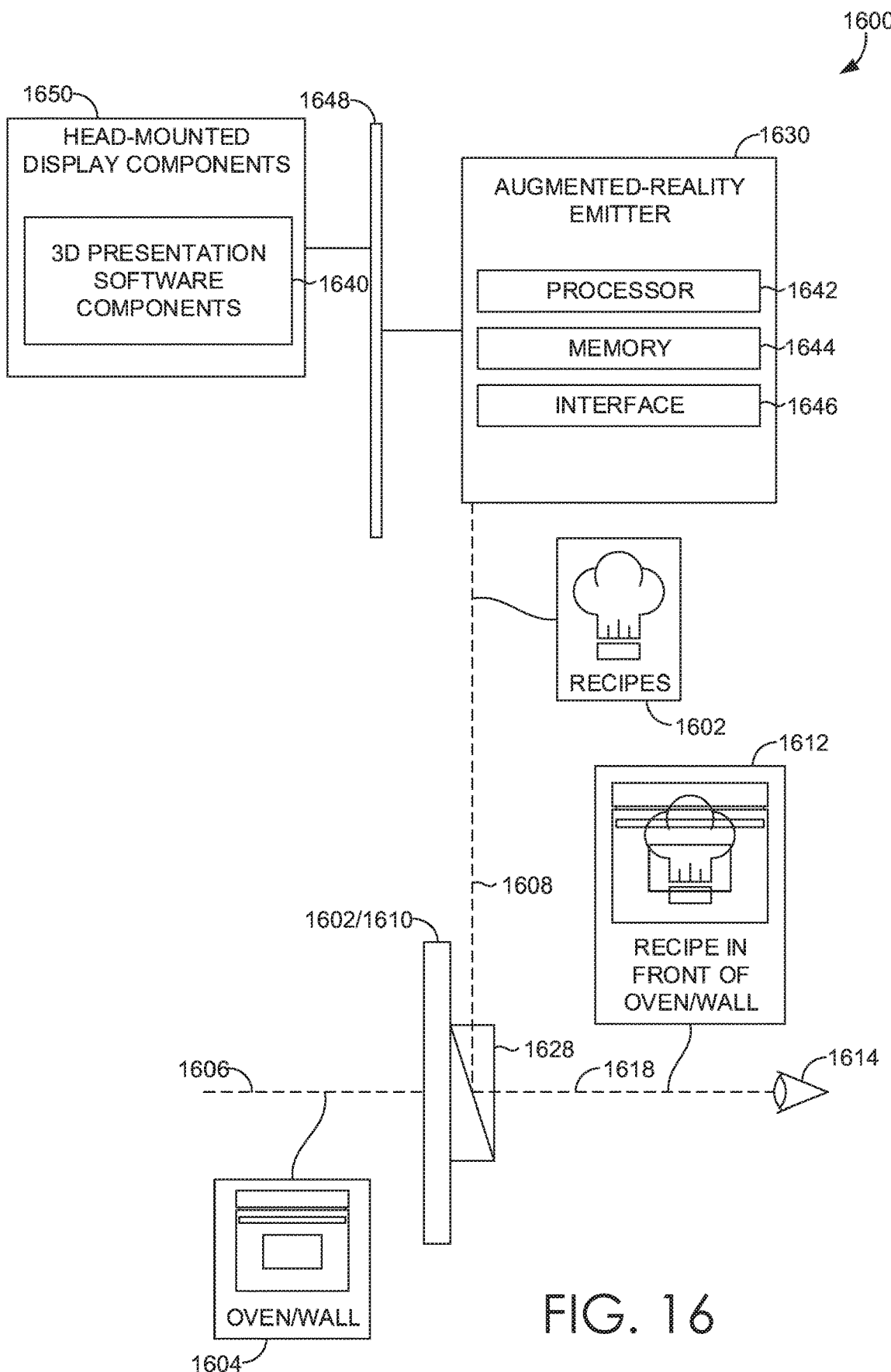
FIG. 16 is a block diagram of an exemplary head-mounted display suitable for use in implementing embodiments described herein.

Turning to FIG. 16, exemplary HMD environment 1600 in which embodiments of the present invention may be implemented is described in order to provide a general context for various aspects of the present invention. Generally, an exemplary HMD might include one or more transparent lenses (e.g., lens 1610), an emitter (e.g., augmented reality emitter 1630) and additional HMD components (e.g., HMD components 1650).

Generally, the HMD positions lens 1610 in front of a user's eye (e.g., eye 1614) in a similar manner as an eyeglass lens. In some embodiments, a pair of transparent lenses can be provided, one for each eye. Light from real-world scene 1604 (e.g., light ray 1606) reaches lens 1610. Augmented reality emitter 1630 facilitates projecting and/or rendering virtual images. Generally, augmented reality emitter 1630 emits light (e.g., light ray 1608) representing a virtual image (e.g., virtual image 1602). Light representing virtual image 1602 (e.g., light ray 1608) also reaches lens 1610. Lens 1610 includes an optical display component 1628, such as a beam splitter (e.g., a half-silvered mirror), that facilitates superimposing virtual image 1602 on top of real-world scene 1604. For example, optical display component 1628 can reflect both of light rays 1606 and 1608 towards the user's eye (e.g., via light path 1618) so the user can view a mixed-reality image (e.g., augmented-reality image 1612). Augmented reality emitter 1630 can utilize additional optics to refocus virtual images so that they appears to originate several feet away from eye 1614, in coordination with real-world scene 1604, instead of at the location of optical display component 1628 (e.g., around an inch from eye 1614).

In the embodiment depicted in FIG. 16, augmented reality emitter 1630 includes components such as processor 1642, memory 1644 and/or interface 1646 that can facilitate augmented reality emitter 1630 functionality. For example, memory 1644 can contain instructions executed by processor 1642 to facilitate rendering, projecting and/or focusing virtual images. Augmented reality emitter 1630 can communicate with HMD components 1650 (e.g., 3D presentation software components 1640) using any suitable communication path (e.g., bus 1648). In this manner, one or more processors (e.g., processor 1642) can operate as one or more control circuits. Other variations for configurations of augmented reality emitter components (e.g., utilizing variations for hardware control circuitry) may be implemented, as would be understood by a person of ordinary skill in the art.

As such, light rays representing a virtual image (e.g., virtual image 1602) and light rays from a real-world scene (e.g., real-world scene 1604) are reflected by display component 1628 toward a user's eye so that the user sees augmented-reality image 1612. Augmented-reality image 1612 is a composite image comprising real-world scene 1604 (e.g., a cooking oven) with virtual image 1602 (e.g., a recipe book icon) superimposed on top. In this manner, a user views a mixed-reality image (e.g., augmented-reality image 1612) in which a virtual image is superimposed on a real-world scene (e.g., the recipe book icon appears hanging in front of the cooking oven).

Exemplary Operating Environment

Figure 17:
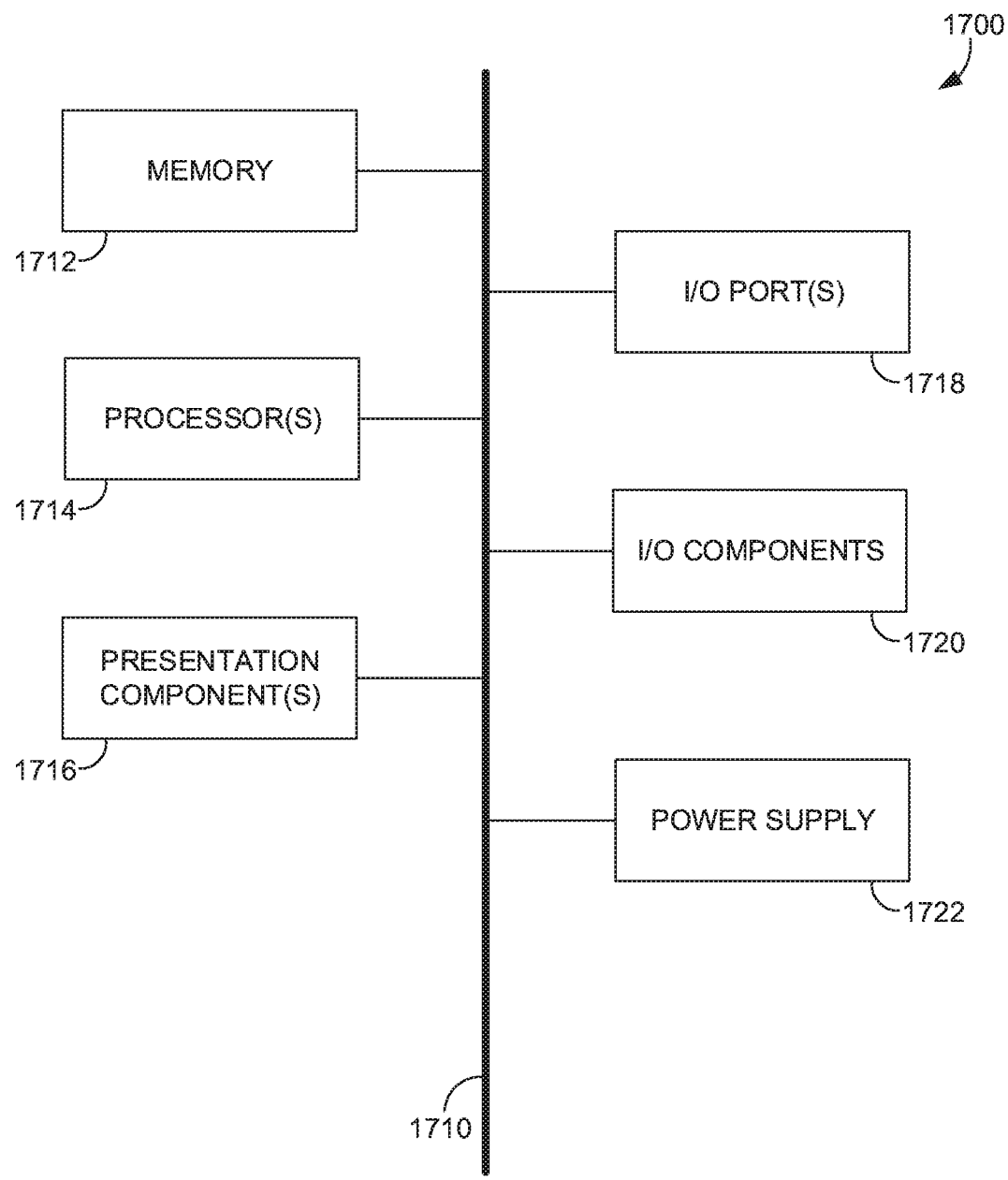
FIG. 17 is a block diagram of an exemplary operating environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 17 in particular, an exemplary operating environment for implementing embodiments of the present invention is shown and designated generally as computing device 1700. Computing device 1700 is but one example of a suitable computing environment and is not intended to suggest any limitation as to the scope of use or functionality of the invention. Neither should computing device 1700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 17, computing device 1700 includes bus 1710 that directly or indirectly couples the following devices: memory 1712, one or more processors 1714, one or more presentation components 1716, input/output ports 1718, input/output components 1720, and illustrative power supply 1722. Bus 1710 represents what may be one or more buses (such as an address bus, data bus, or combination thereof). The various blocks of FIG. 17 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 17 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 17 and reference to "computing device."

Computing device 1700 typically includes a variety of computer-readable media. Computer-readable media can be any available media that can be accessed by computing device 1700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1712 includes computer storage media in the form of volatile and/or nonvolatile memory. The memory may be removable, non-removable, or a combination thereof. Exemplary hardware devices include solid-state memory, hard drives, optical-disc drives, etc. Computing device 1700 includes one or more processors that read data from various entities such as memory 1712 or I/O components 1720. Presentation component(s) 1716 present data indications to a user or other device. Exemplary presentation components include a display device, speaker, printing component, vibrating component, etc.

I/O ports 1718 allow computing device 1700 to be logically coupled to other devices including I/O components 1720, some of which may be built in. Illustrative components include a microphone, joystick, game pad, satellite dish, scanner, printer, wireless device, etc.

With reference to the 3D presentation system, embodiments described herein support authoring and presenting in augmented reality. The 3D presentation system components refer to integrated components for authoring and presenting in augmented reality. The integrated components refer to the hardware architecture and software framework that support functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the 3D presentation system can include an API library that includes specifications for routines, data structures, object classes, and variables may support the interaction between the hardware architecture of the device and the software framework of the 3D presentation system. These APIs include configuration specifications for the 3D presentation system such that the different components therein can communicate with each other in the 3D presentation system, as described herein.

Having identified various components utilized herein, it should be understood that any number components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b). Various components described herein can be configured for performing novel aspects of embodiments, where the term "configured for" can refer to "programmed to" perform particular tasks or implement particular abstract data types using code.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A method for spatially authoring three dimensional ("3D") presentations, the method comprising:
   generating a virtual 3D environment comprising a virtual representation of one or more 3D assets, wherein the virtual 3D environment is generated in an authoring mode associated with a 3D interface that supports spatial authoring including aligning one or more 3D assets relative to a physical space based on scenes and behaviors,
   wherein, in the authoring mode, each of the scenes predefines a particular arrangement of the one or more 3D assets and the corresponding behaviors in the physical space for rendering in a presentation mode;
   generating a 3D presentation, wherein the 3D presentation comprises the scenes and the behaviors of the one or more 3D assets in alignment with the physical space, wherein the 3D presentation is associated with the 3D interface; and
   providing the 3D presentation for rendering of the scenes including 3D images of the one or more 3D assets and the corresponding behaviors.

2. The method of claim 1, wherein the 3D presentation is configured to facilitate a selectively rendered 3D virtual image of a gaze heat map indicating a concentration of audience gaze vectors.

3. The method of claim 1, wherein behavior parameters for the behaviors are set in association with temporary ownership of corresponding 3D assets.

4. The method of claim 1, additionally comprising:
   including in the 3D presentation a toggled scrubbable animation of a first of the 3D images to enable one of a plurality of audience devices to update a current state of an associated one of the one or more 3D assets to scrub the animation; and
   providing for distributing the current state substantially in real-time to facilitate coordinated rendering of the scrubbable animation.

5. The method of claim 1, additionally comprising:
   toggling a spatial storyboarding mode to enable one or more author devices to record a 3D drawing using a 3D interface; and
   distributing the 3D drawing to facilitate coordinated rendering of the 3D drawing, wherein the 3D drawing comprises one or more segments capable of being replaced with a corresponding one of the one or more 3D assets.

6. The method of claim 1, additionally comprising including in the 3D presentation a 3D volumizer animation, wherein the 3D volumizer animation is a 3D visualization comprising 3D image replicates of a selected 3D model, wherein the 3D volumizer animation is configured to visually illustrate data based on first behavior parameters for a first collection of the one or more 3D assets, wherein the first behavior parameters comprise the selected 3D model and a selected quantity of the 3D image replicates of the 3D model to be generated for the first collection.

7. The method of claim 1:
   wherein a first of the behaviors is configured to permit an audience device to influence a coordinated rendering of a data visualization based on a location of the audience device; and
   wherein a first one of the 3D images comprises the data visualization.

8. One or more computer storage media storing computer-useable instructions that, when used by one or more computing devices, cause the one or more computing devices to perform operations comprising:
   generating a virtual three-dimensional ("3D") environment comprising a virtual representation of one or more 3D assets, wherein the virtual 3D environment is generated in an authoring mode associated with a 3D interface that supports spatial authoring including aligning one or more 3D assets relative to a physical space based on scenes and behaviors,
   wherein, in the authoring mode, each of the scenes predefines a particular arrangement of the one or more 3D assets and the corresponding behaviors in the physical space for rendering in a presentation mode;
   receiving a 3D presentation, wherein the 3D presentation comprises the scenes and the behaviors of the one or more 3D assets in alignment with the physical space, wherein the 3D presentation is associated with the 3D interface; and
   providing the 3D presentation for rendering of the scenes including 3D images of the one or more 3D assets and the corresponding behaviors.

9. The media of claim 8, wherein the operations additionally comprise providing for selective rendering, by the presenter device, of a 3D virtual image of a gaze heat map indicating a concentration of audience gaze vectors associated with the audience devices.

10. The media of claim 8, wherein behavior parameters for the behaviors are set in association with temporary ownership of corresponding 3D assets.

11. The media of claim 8, wherein the operations additionally comprise:
   toggling a scrubbed animation of a first of the 3D images to enable one or more audience devices to update a current state of an associated one of the one or more 3D assets to scrub the animation; and distributing the current state substantially in real-time to facilitate coordinated rendering of the scrubbed animation.

12. The media of claim 8, wherein the operations additionally comprise:
   toggling a drawing with light mode to enable an audience device to record a time-dependent 3D drawing using a 3D interface; and
   distributing the 3D drawing substantially in real-time to facilitate coordinated rendering of the 3D drawing.

13. The media of claim 8, wherein the operations additionally comprise triggering a 3D volumizer animation, wherein the 3D volumizer animation is a 3D visualization comprising 3D image replicates of a selected 3D model, wherein the 3D volumizer animation is configured to visually illustrate data based on first behavior parameters for a first collection of the one or more 3D assets, wherein the first behavior parameters comprise the selected 3D model, a selected quantity of the 3D image replicates of the 3D model to be generated for the first collection, and physics to be applied to the replicates.

14. The media of claim 8:
   wherein a first of the behaviors is configured to permit at least one audience device to influence a coordinated rendering of a data visualization based on a location of the at least one audience device; and
   additionally comprising triggering a first one of the 3D images comprising the data visualization.

15. A computer system comprising:
   one or more hardware processors and memory configured to provide computer program instructions to the one or more hardware processors;
   a three-dimensional ("3D") environment generator configured to utilize the one or more hardware processors to generate a virtual 3D environment comprising a virtual representation of one or more 3D assets, wherein the virtual 3D environment is generated in an authoring mode associated with a 3D interface that supports spatial authoring including aligning one or more 3D assets relative to a physical space based on scenes and behaviors,
   wherein, the authoring mode, each of the scenes predefines a particular arrangement of the one or more 3D assets and the corresponding behaviors in the physical space for rendering in a presentation mode;
   an authoring component configured to utilize the one or more hardware processors to generate a 3D presentation, wherein the 3D presentation comprises the scenes and the behaviors of the one or more 3D assets in alignment with the physical space, wherein the 3D presentation is associated with the 3D interface; and
   a presentation component configured to utilize the one or more hardware processors to provide the 3D presentation for rendering of the scenes including 3D images of the one or more 3D assets and the corresponding behaviors.

16. The computer system of claim 15, wherein the presentation component is additionally configured to selectively render a 3D virtual image of a gaze heat map indicating a concentration of audience gaze vectors.

17. The computer system of claim 15, wherein the presentation component is additionally configured to:
   toggle a scrubbed animation of a first of the 3D images to enable an audience device to update a current state of an associated one of the one or more 3D assets to scrub the animation; and
   receive the current state substantially in real-time to facilitate coordinated rendering of the scrubbed animation.

18. The computer system of claim 15, wherein the presentation component is additionally configured to:
   toggle a drawing with light mode to enable one or more author devices to record a time-dependent 3D drawing using a 3D interface and to enable capturing an associated audio recording; and
   receive the 3D drawing and the associated audio recording to facilitate coordinated playback of the 3D drawing and the associated audio recording, wherein the playback of the 3D drawing comprises visualization trails that do not disappear.

19. The computer system of claim 15, wherein the presentation component is additionally configured to trigger a 3D volumizer animation, wherein the 3D volumizer animation is a 3D visualization comprising 3D image replicates of a selected 3D model, wherein the 3D volumizer animation is configured to visually illustrate data based on first behavior parameters for a first collection of the one or more 3D assets, wherein the first behavior parameters comprise the selected 3D model, a selected quantity of the 3D image replicates of the 3D model to be generated for the first collection, and an idle animation to be applied to the 3D image replicates.

20. The computer system of claim 15:
   wherein a first of the behaviors is configured to permit one of the audience devices to influence a coordinated rendering of a data visualization based on a location of the audience device;
   wherein the presentation component is additionally configured to trigger a first one of the 3D images comprising the data visualization.

* * * * *